United States Patent [19]

Yoshizawa et al.

[11] Patent Number: 5,235,679
[45] Date of Patent: Aug. 10, 1993

[54] GUIDANCE METHOD AND APPARATUS UPON A COMPUTER SYSTEM

[75] Inventors: Satoshi Yoshizawa, Kawasaki; Hirotada Ueda, Kokubunji; Hitoshi Matsushima, Tachikawa, all of Japan

[73] Assignee: Hitachi, Ltd., Tokyo, Japan

[21] Appl. No.: 943,979

[22] Filed: Sep. 11, 1992

Related U.S. Application Data

[63] Continuation of Ser. No. 537,493, Jun. 12, 1990, abandoned.

[30] Foreign Application Priority Data

Jun. 14, 1989 [JP] Japan ................................ 1-149631

[51] Int. Cl.$^5$ ............................................. G06F 15/46
[52] U.S. Cl. ..................................... 395/156; 395/155; 395/159; 395/161; 340/747
[58] Field of Search ................ 340/747, 750, 706; 395/155, 156, 159, 161

[56] References Cited

U.S. PATENT DOCUMENTS

| | | | |
|---|---|---|---|
| 4,918,622 | 4/1990 | Granger et al. | 364/518 |
| 4,947,343 | 8/1990 | Amari | 364/518 |
| 4,961,070 | 10/1990 | Maher et al. | 340/721 |
| 4,965,741 | 10/1990 | Winchell et al. | 364/513 |
| 5,008,810 | 4/1991 | Kessel et al. | 364/200 |
| 5,021,976 | 6/1991 | Wexelblat et al. | 364/521 |

FOREIGN PATENT DOCUMENTS 63-280317  11/1988  Japan .

Primary Examiner—Phu K. Nguyen
Attorney, Agent, or Firm—Fay, Sharpe, Beall, Fagan, Minnich & McKee

[57] ABSTRACT

When a guidance function is actuated in a guidance method in a computer system, icons displayed on a screen are picked up to form their list. When a user designates an icon requiring the guidance, the guidance scenario corresponding to the designated icon is picked up, and icons required to execute the guidance scenario is allotted to the guidance scenario from the list. Thereafter, the guidance scenario is demonstrated using the allotted icons.

25 Claims, 23 Drawing Sheets

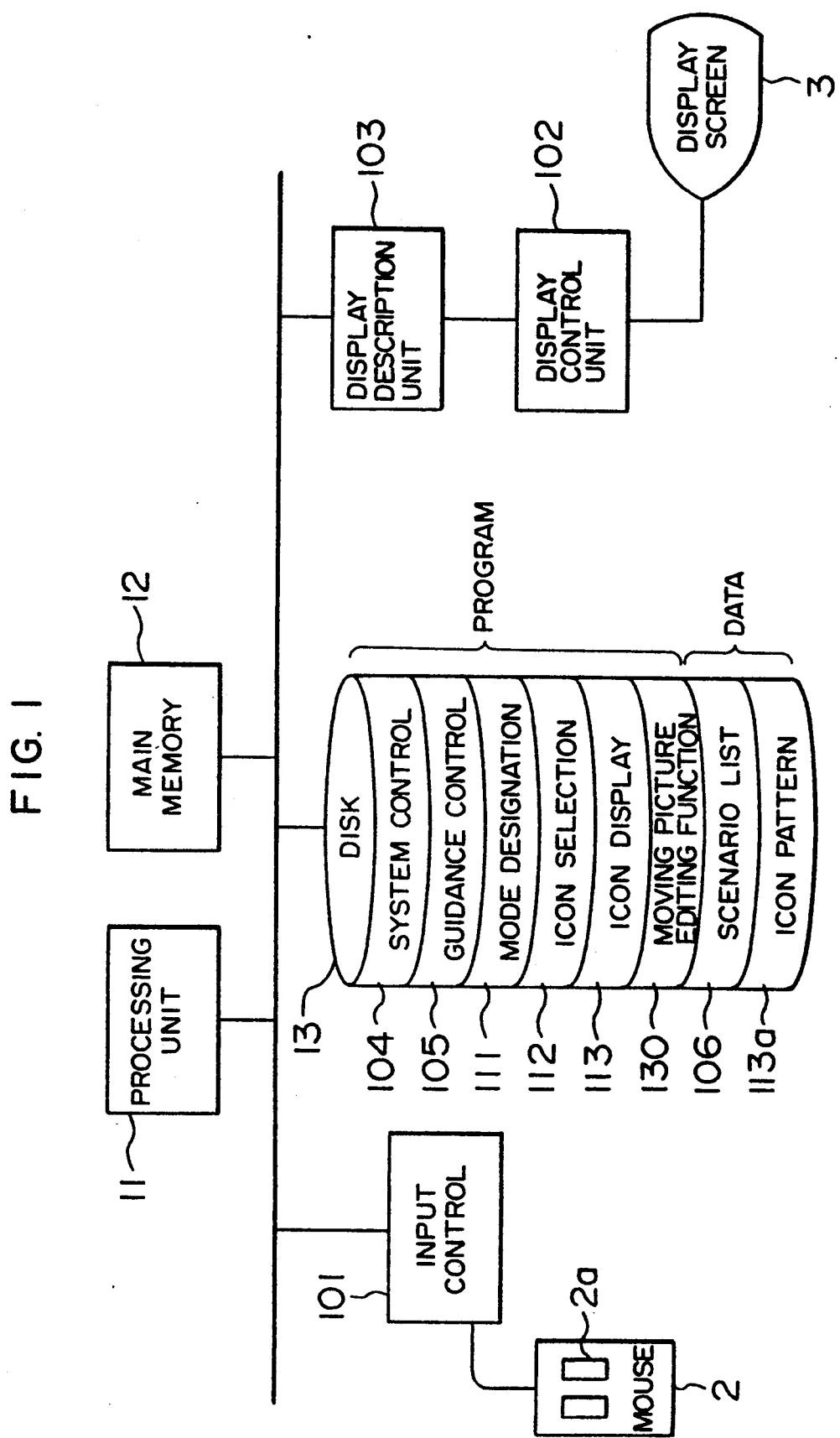

FIG. 4B

| ICOM NAME | DISPLAY POSITION | DISPLAY SIZE | ICON PATTERN | DATA SIZE OF ICON PATTERN | REAL DATA | DATA SIZE OF REAL DATA |
|---|---|---|---|---|---|---|
| FILM ICON #1 | (x, y) | (w, h) | ICON FILE 1 | 400 BYTE | 01234..... | 10M BYTE |

251

252 253 254 255 256 257

| | COORDINATE | SIZE |
|---|---|---|
| C | $(x_1, y_1)$ | $(w_1, h_1)$ |
| A1 | $(x_2, y_2)$ | $(w_2, h_2)$ |
| Cf | $(x_f, y_f)$ | — |

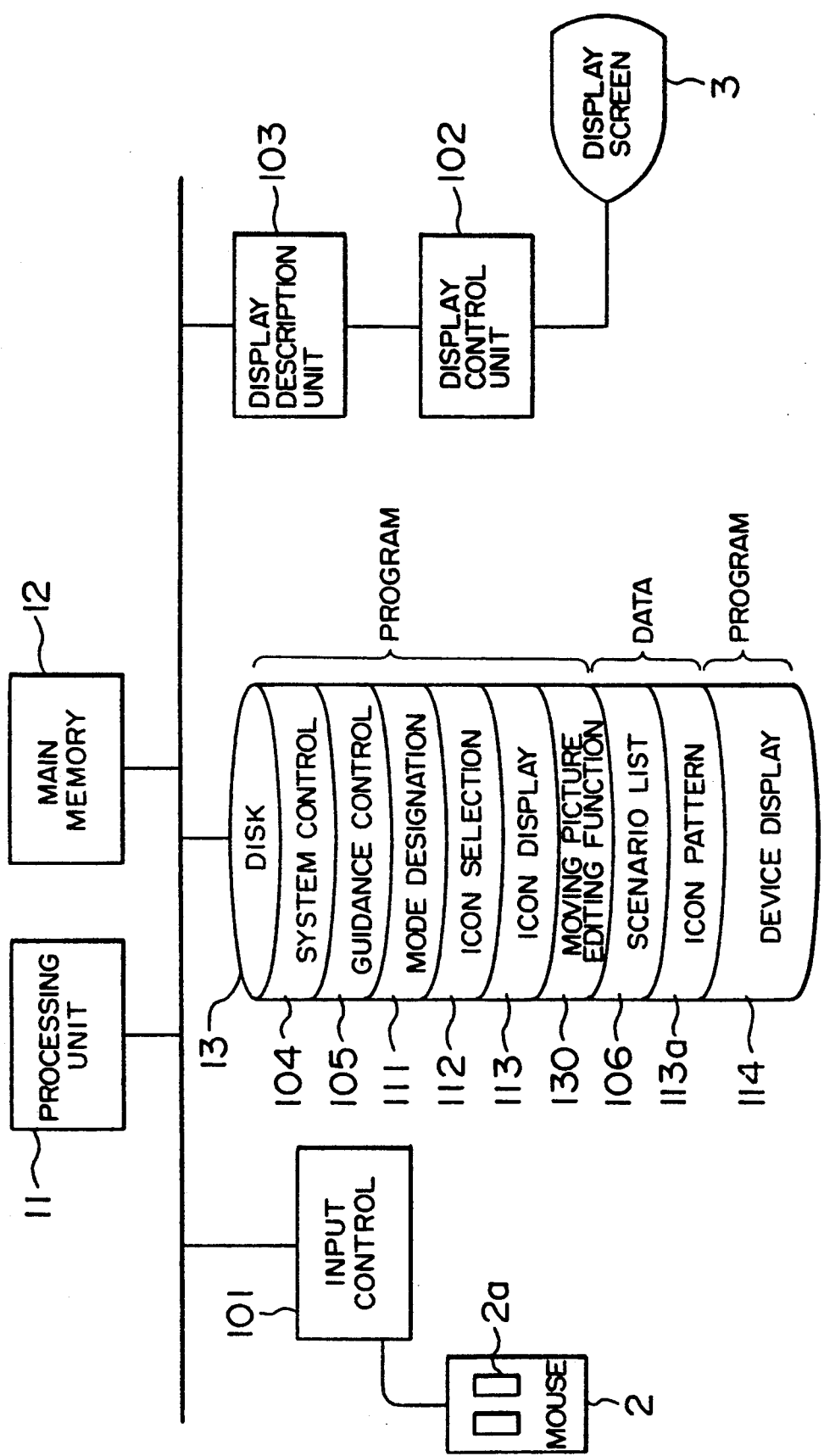

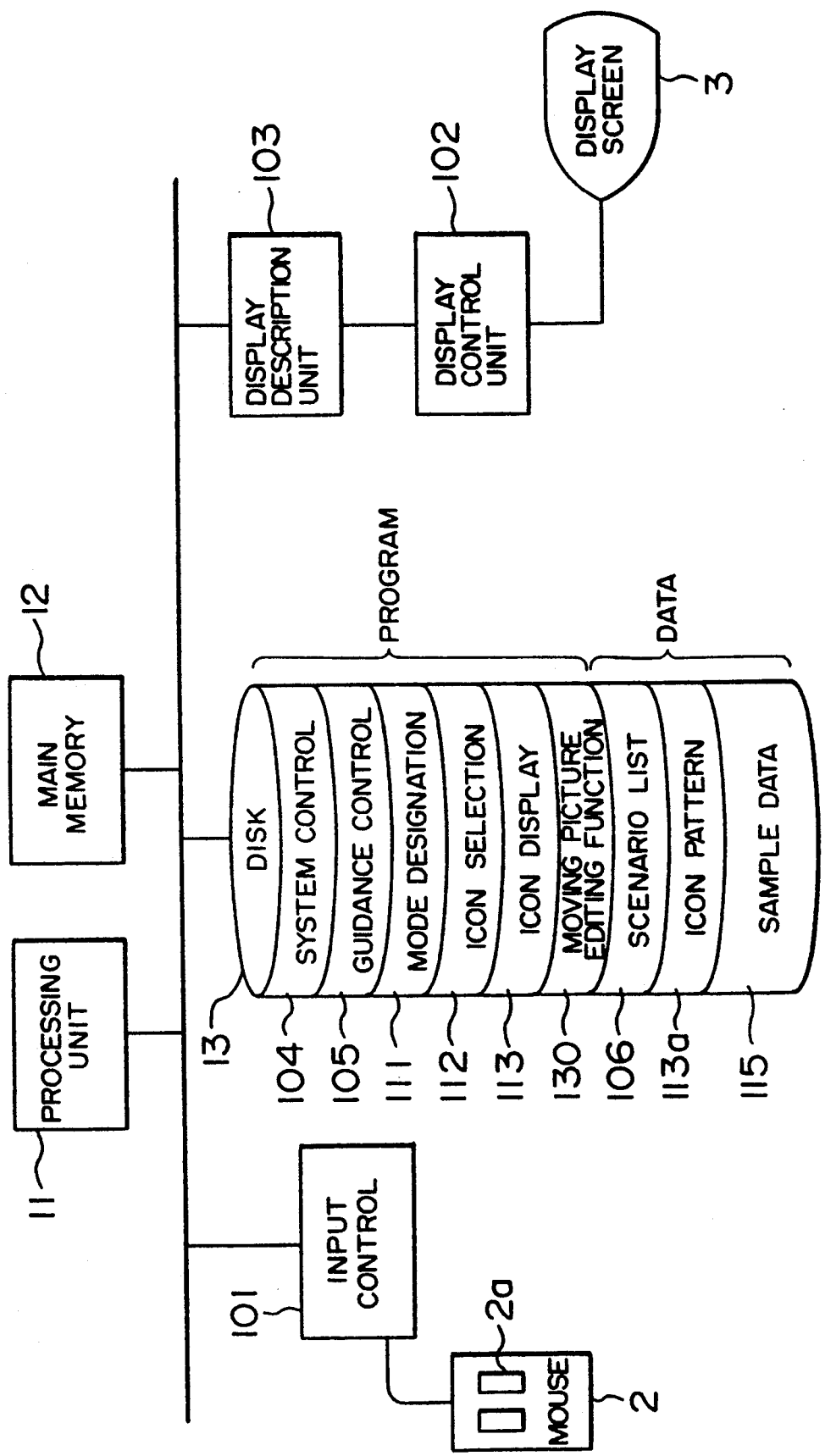

GUIDANCE METHOD AND APPARATUS UPON A COMPUTER SYSTEM

This is a continuation of application Ser. No. 07/537,493 filed Jun. 12, 1990, now abandoned.

BACKGROUND OF THE INVENTION

The present invention relates to a guidance function of explaining the function of a computer system such as a workstation, its operating method, etc. on its display screen to a user in accordance with his request, and more particularly to an online guidance function which is effectively used for a system having a visual man-machine interface whose typical type is direct manipulation using icons.

The related art is a help system which, when a user operates a computer in a time sharing manner from a terminal, can display explanations on the term to be searched and the related terms on a terminal screen in the form of a sentence; this help system is disclosed in JP-A-63-280317.

Further, the system having a man-machine interface to which a command is input as a series of characters through a keyboard frequently used a guidance function of explaining terms in the form of sentences or the operations of the system in the form of sentences and/or illustrations. However, such a guidance function is not sufficient for the system having a man-machine interface of the direct manipulation type in which icons representative of processings or data using pictures are manipulated using a pointing device such as a mouse. This is because with the direct manipulation type of man-machine interface, a user is required to actually execute physical manipulations of shifting the icons, superposing two icons on each other, etc. on the display screen. It is difficult to explain the physical manipulation or action using only sentences and illustrations in the field of computers as well as in any other fields. In many cases, lengthy sentence explanation of manipulations to be done under several conditions cannot make it possible for the user to understand the manipulation to be actually done under the condition where the user is placed.

Further, in the direct manipulation type of man-machine interface, the information useful for a user is included in the arrangement of icons on the display screen and layout itself of the display screen. For example, in many cases, the user recognizes the icon in terms of the positional element as well as its design in the manner of e.g. "icon having such a design placed near here on the display screen". In the prior art help system, however, when its help function is actuated, the display on the screen will turn into a help display; thus, continuity of display will be lost thereby stopping the thinking process of the user.

Further, in some cases, the processing or operation corresponding to a certain icon designed by a user depends on the situation where the icon is used. For example, if one icon is to be superposed on another icon, the processing to be executed depends on the icon to be superposed. Such a case cannot be satisfactorily explained by the prior art help system.

Further, in the prior art help system, a user cannot know the limit of processing, e.g. the range of his own data which can be processed and the kinds of processing which can be executed for the data. Therefore, the user cannot use a useful function because of his ignorance of the function.

Meanwhile, in order to teach a user the summary of how to use a computer system and the functions of the system in their highlights, a 'demonstration program' can be proposed. The demonstration program, using previously prepared data, can explain to a user the functions of icons and display their actions on the screen for the user along with a previously prepared story. However, the demonstration program does not permit the user to see the explanation of the functions in only its necessary part in accordance with his necessity. The demonstration program, which cannot immediately give the explanation of the function which the user desires to know in a certain situation, cannot be used for a guidance function.

Further, in both help system and demonstration program, a user may feel unsure if the function at issue can be also applied to an inapplicable object. In this case, even if the user executes a certain operation, the system does not operate in the manner as expected by the user. Consequently, the user will feel that the system is poor in manageability.

SUMMARY OF THE INVENTION

An object of the invention is to provide a guidance function useful for a workstation having a visual man-machine interface of the direct manipulation type in which icons are manipulated using a pointing device such as a mouse.

In order to attain the above object, in accordance with the present invention, there are provided mode designating means, icon display means, and icon selecting means for interactive processing for a computer. A guidance control means is further provided to actuate the icons on a display screen along a prepared scenario to teach a user how to use the computer system. In this case, data represented by icons, including real data prepared by a user and sample data prepared beforehand, will be subjected to guidance processings. It should be noted that the data represents image data and character series data.

Device display means is also provided to explain how to use a device such as a mouse for manipulating the icons.

If an icon permits plural kinds of processing to be activated, candidate display means is provided to display the result of the processings or the processings in progress. Candidate selecting means is also provided to select the processing that a user desires to see.

Parameter inputting means is provided so that a user can input data interactively while the guidance function is carried out.

In order to perform the guidance in accordance with the skill level of a user, history reference means for permitting the system itself to refer to the manipulation history of the user before performing the guidance is provided and processing selecting means is also provided to select the guidance processing in accordance with the intelligence level of the user.

Demonstration operating means may be provided so that a user can designate the manner (e.g. speed) of performing the guidance.

In accordance with the present invention, first a certain icon is selected by the icon selecting means among the icons displayed previously by the icon display means icon; when the guidance function is actuated by the mode designating means, in order to explain the processing of the selected icon and how to manipulate it, subjecting the user's own real data or sample data prepared beforehand to the guidance processing, the guidance control means actually demonstrates the icon manipulation on the screen for the user. Therefore, looking at the demonstration, the user can effectively learn the functions of the system and how to use it.

The device display means, which serve to explain how to use the device for manipulating the icons during the demonstration of the guidance, permits the user to simultaneously learn the functions of the system and the method of executing them.

If there are plural kinds of processing which can be executed when the guidance function is actuated, provision of the candidate display means and candidate selecting means permit the result of the processings or the processings in progress to be displayed and permit a user to select the processing that he desires to see. Thus, the user can easily receive the guidance in accordance with the necessity when the guidance function is actuated. Also, since several processing function can be displayed for the user, his degree of understanding for the system can enhanced.

The parameter inputting means, which interactively receives data from the user during the demonstration of the guidance function, permits the things the user desires to know to be demonstrated on the screen as they are.

The provision of the history reference means and the processing selecting means permits the guidance to be performed in accordance with the intelligent level of a user, and thus the user can understand gradually the entire system as he uses the system longer.

The demonstration operating means permits the user to designate the method of demonstrating the guidance function so that the part of guidance that the user desires to know can be executed repeatedly, thereby deepening his understanding of the system.

In this way, in accordance with the present invention, effective guidance function can be realized for the man-machine interface of the direct manipulation type using icons. More specifically, both of the function of the icon to be explained and the method of manipulating the icons are displayed on a display screen so that a user can understand them, and the guidance is demonstrated using the user's own data; thus, it is possible to cause the user to have the actual feeling of manipulation, and also possible to teach him the details which could not sufficiently explained by the sentences and illustrations in the prior art. Therefore, the time for the user to master the use of the system can be shortened. Further, the functions of the system which the user does not generally notice can be presented by guidance function according to the present invention so that degree of total understanding of the system can be deepened.

BRIEF DESCRIPTION OF THE DRAWINGS

FIG. 1 is a block diagram showing the system arrangement according to a first embodiment of the present invention;

FIG. 4B is a view showing an information management table;

FIG. 7 is a block diagram showing the system arrangement according to a second embodiment of the present invention;

FIGS. 10 and 11 are block diagrams showing the system arrangements according to third and fourth embodiments of the present invention, respectively;

DESCRIPTION OF THE PREFERRED EMBODIMENT

Figure 2A:
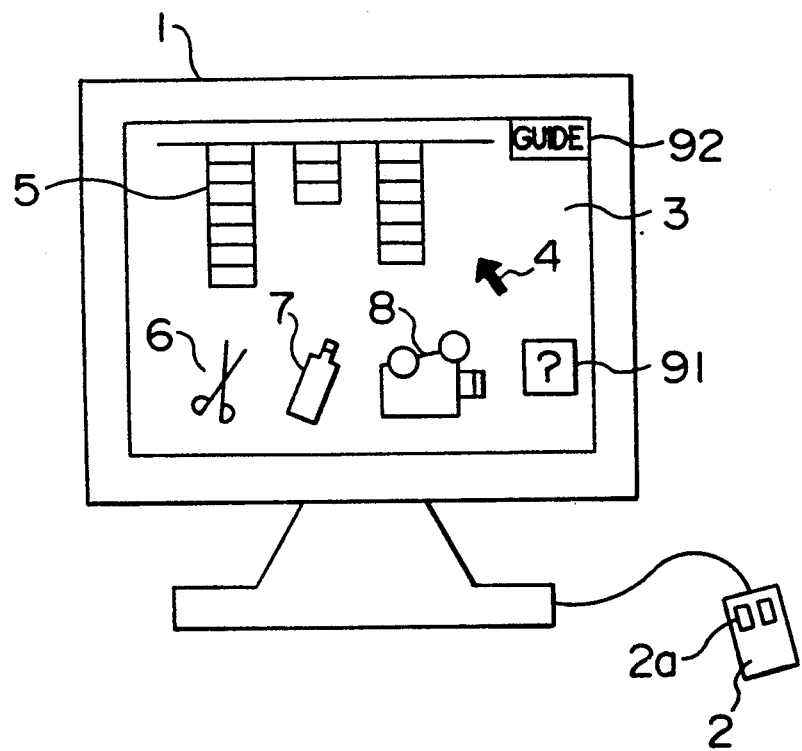
FIG. 2A is a view showing an example of the display screen for the computer system according to the first embodiment.

Now referring to the drawings, explanation will be given for several embodiments of the present invention.

FIG. 1 shows the system arrangement according to a first embodiment of the present invention. In FIG. 1, 11 is a processing unit; 12 is main storage; and 13 is auxiliary storage (e.g. disk).

101 is an input control unit for controlling an input device such as a mouse. The input control unit 101 reads in a signal from the input device and analyzes it. The analysis result is reported to the other program which is on standby for input by a user. For example, when the user presses a mouse button 2a, the operation to be done is reported.

102 is a display control unit for controlling the image display on a display screen (simply called screen) 3. The contents described on a display description unit 103 by the other program will be displayed on the screen 3. The display contents include the display components such as icons and menus. More specifically, the names of the respective display components, their attributes, the data or processings to be represented by icons, the relationships among the display components, etc. are described on the display description unit 103. The display positions of the display components on the screen 3 are described. Changes in the display contents such as movement of the icons are executed by changing the description contents on the display description unit 3 using the other control program.

The display description unit 103 corresponds to the place where a window manager performs processings in a window system used on a workstation.

The disk 13 stores data and the following programs.

A system control program 104 serve to start and control functions prepared in the system.

A guidance control program 105 serves to control the guidance mode according to this embodiment. The guidance control program 105 uses as data a scenario list 106 which describes data corresponding to the processing to be made during the demonstration of the guidance. The guidance control program 105 and the scenario list 106 will be explained later in detail.

A mode designating program 111 serves to designate the shift to the mode (e.g. the guidance mode according to this embodiment) prepared in the system.

An icon selection program 112 serves to select the icons displayed on the screen 3.

An icon display program 113 serves to describe an icon pattern 113a and its display position on the display description unit 103 to display the icon on the screen 3.

A moving picture editing function program 130 serves to execute the function of a moving picture editor which will be described later. The moving picture editing program 130 corresponds to an application program in the workstation.

FIG. 2A shows an example of display in a moving picture editor. The moving picture editor is implemented on a workstation 1. A user can edit the moving picture by moving the mouse 2 to execute the moving picture editing program 130.

In operation, a mouse cursor 4 displayed on the screen 3 moves in accordance with the movement of the mouse 2 by the user. More specifically, the input control unit 101, when reading in the signal from the mouse 2, reports to the system control program 104 that the mouse 2 has been moved by the user. Correspondingly, the system control program 104 renews the information on the display position of the mouse cursor 4 described on the display description unit 103. The display control unit 102 refers to the display description unit 103 to move the display position of the mouse cursor 4 on the screen 3.

Arranged on the screen 3 are film icons (which are icons having the forms similar to films; the icons mentioned below have the same meanings) representative of fragments (called clips) of moving picture data. Also displayed on the screen are a scissors icon 6 used to cut the film icons 5, a bond icon 7 used to bond the film icons 5 to be connected with each other, a projector icon 8 used to see the contents of the film icons, and a guidance starting icon 92 used to start the guidance. These icons can be displayed on the screen 3 in such a manner that the icon display program 113 describes on the display description unit 103 data representative of the names of the icons and their display positions on the screen and icon patterns 113 read from the disk 13, and the display control unit 102 refers to the data described on the display description unit 103.

The user can edit the moving picture data by designating these icons displayed on the screen 3 using the mouse cursor 4. In this case, the user moves the mouse cursor 4 onto the icon to be selected by handling the mouse 2 and then presses the mouse button 2a to select the icon. Specifically, the icon selecting program 112, when receiving from the input control unit 112 a report that the mouse button 2a has been pressed, refers to the display position of the mouse cursor 4 described on the display description unit 103 and that of the icon described there through the icon display program 113 to search the icon superposed on the mouse cursor 4.

Figure 2B:
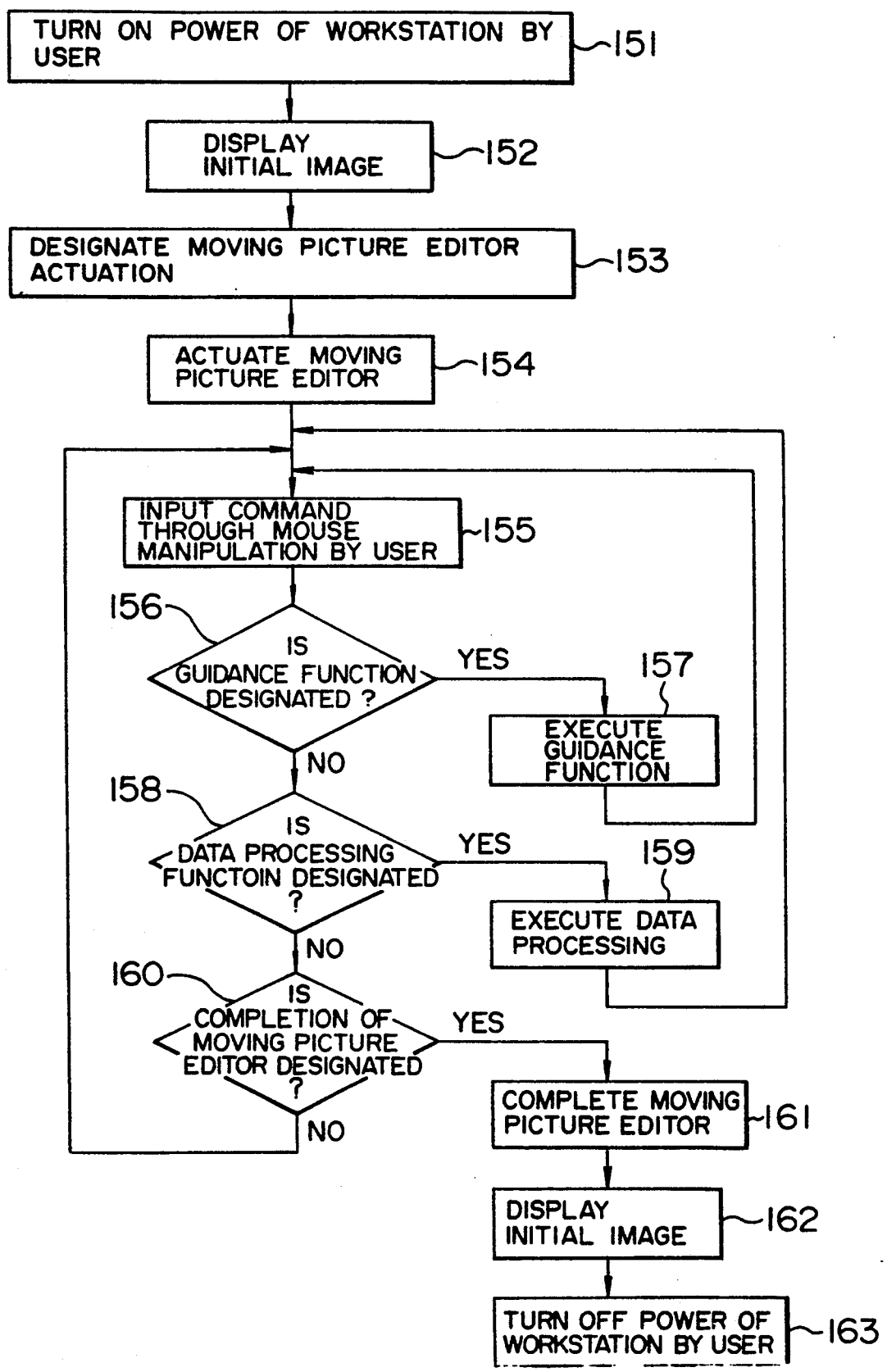
FIG. 2B is a flowchart showing the process for executing the guidance according to the first embodiment.

FIG. 2B shows an example of the entire process to be executed on a workstation in demonstrating the guidance function.

First, when the power for the workstation is turned on by a user (step 151), an initial image is displayed on the screen 3 (step 152). In step 153, the user designates an application program (e.g. the moving picture editor shown in FIG. 2A) to be actuated for the initial image. Then, in step 154, the moving picture editor is actuated or started.

When the moving picture editor is actuated, the user starts to edit the moving picture data in the manner as described above. More specifically, in step 155, the user inputs a command to the moving picture editor by handling the mouse 2 to move the mouse cursor 4 on the screen 3 and pressing the mouse button 2a.

In step 156, whether or not the command input in step 155 designates a guidance function is examined. If the answer is 'yes', in step 157, the guidance function is actuated and the guidance is demonstrated for the user. The detail of this processing will be explained later.

Upon completion of step 157, the process is returned to step 155 to receive a command from the user.

If the answer in step 156 is 'no', in step 158, examination is made on whether or not the command input in step 155 designates a function of editing the moving picture data. If the answer is 'yes', in step 159, the designated edition function is executed to process the moving picture data. Upon completion of step 159, the process is returned to step 155 to receive a command from the user.

If the answer is 'no' in step 158, examination is made on whether or not the command input in step 155 designates completion of the moving picture editor. If the answer is 'no', the process is returned to step 155 to receive a command from the user.

If the answer in step 158 is 'yes', in step 161, the moving picture editor is completed, and in step 162, the initial image is displayed. In step 163, the user switches off the power for the workstation to complete the process consisting a series of processings on the workstation.

Now referring to FIGS. 3A to 3D, explanation will be given for the processings executed on the workstation in demonstrating the guidance function in step 157 in the flowchart of FIG. 2B.

Figure 3A:
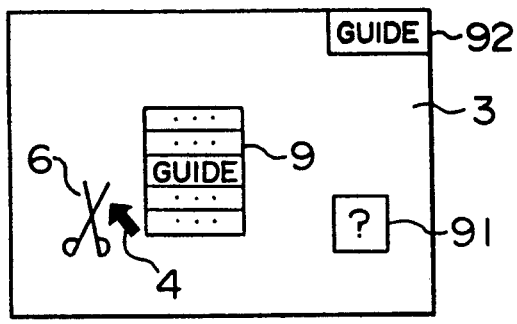
FIGS. 3A to 3D are views showing the operation on the screen in starting the guidance according to the first embodiment.

FIG. 3A relates to the case where a user actuates the guidance function designated by the command input in step 155 in order to accept the explanation on how to use the scissors icon 6. In operation, the user moves the mouse cursor 4 onto the scissors icon 6 by handling the mouse 2. Now when the user presses the mouse button 2a, the icon selection program 112 detects that the scissors icon 6 has been selected and reports it to the mode designating program 111. When the mode designating program 111, when receiving the report that the scissors icon 6 has been selected, displays on the screen 3 a pop-up menu 9 which is displayed in accordance with a specific operation by the user. Until the user selects an item of the pop-up menu 9, the mode selecting program 111 reads in the signal from the input control unit 101. When an item of 'GUIDE' on the pop-up menu 9 is selected by the user, step 156 in FIG. 2B branches into 'yes'; then, the guidance function 105 is actuated to execute step 157.

In the above case, the guidance function is actuated after the user designates a scissors icon. However, the guidance function may be first designated. More specifically, the user first moves the mouse cursor onto the region where no icon is displayed on the screen 3, and then presses the mouse button 2a. The icon selecting program 112 reports to the mode designating program 111 that the mouse button 2a has been pressed on the region where no icon is displayed. Then, the mode designating program displays the pop-up memory 9 on the screen 3. When an item of 'GUIDE' on the pop-up menu 9 is selected by the user, step 156 in FIG. 2B branches into 'yes'; then, the guidance function 105 is actuated to execute step 157.

Figure 3B:
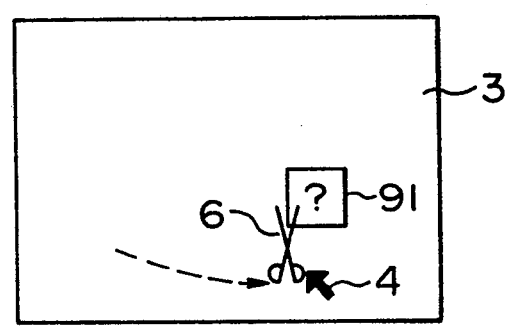

Further, the guidance function may be actuated using a guidance actuation icon 91 which is previously displayed on the screen by the icon display program 113 as shown in FIG. 3B. More specifically, the user first moves the mouse cursor 4 onto the scissors icon 6 and then presses the mouse button 2a. With the mouse button 2a being pressed, the user further handles the mouse 2 to move the scissors icon 6 on the screen 3. In this case, the scissors icon 6 moves in engagement with the movement of mouse cursor 4 until the mouse button 2a is released. This movement of the icon, which is called 'drag', is executed by the system control program 104. In order to actuate the guidance function for the scissors icon 6, the user drags the scissors icon 6 onto the guidance actuation icon 91 and then releases the mouse button 2a; the system control program 104 detects that the mouse button 2a has been released when the scissors icon 6 is on the guidance actuation icon 91, thereby actuating the guidance control program 105.

In the case of FIG. 3B, the guidance function for scissors icon 6 may be also actuated by first selecting the guidance actuation icon 91 and thereafter selecting the scissors icon 6 for which the guidance should be implemented. In this case, the icon selecting program 112 first detects that the guidance actuation icon 91 has been selected by the user and reports this to the system control program 104. Subsequently, the icon selecting program 112 detects that the scissors icon 6 has been selected by the user and reports this to the system control program 104. Then, the system control program 104 actuates the guidance control program 105 to actuate the guidance for the selected scissors icon 6.

Figure 3C:
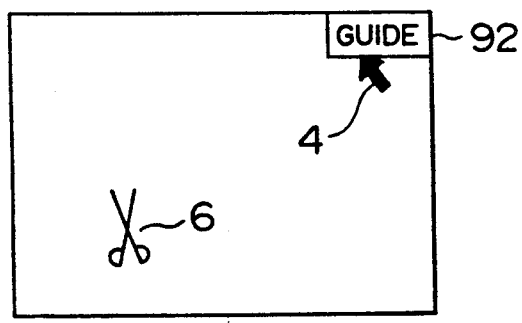
Figure 3D:
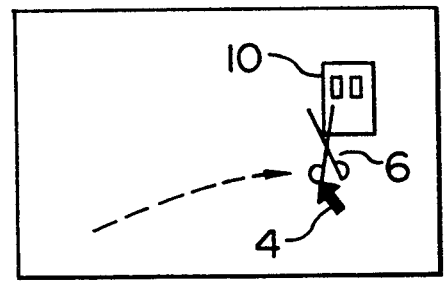

Further, the guidance function may be actuated using a guidance actuation menu 92 which is previously displayed on the screen 3 as shown in FIGS. 3C and 3D. More specifically, the user first moves the mouse cursor 4 onto the guidance actuation menu 92 and then clicks the mouse button 2a to designate the guidance function. The user selects the scissors icon 6 for which the guidance should be executed. In this way, the guidance function can be actuated for the scissors icon 6.

Figure 4A:
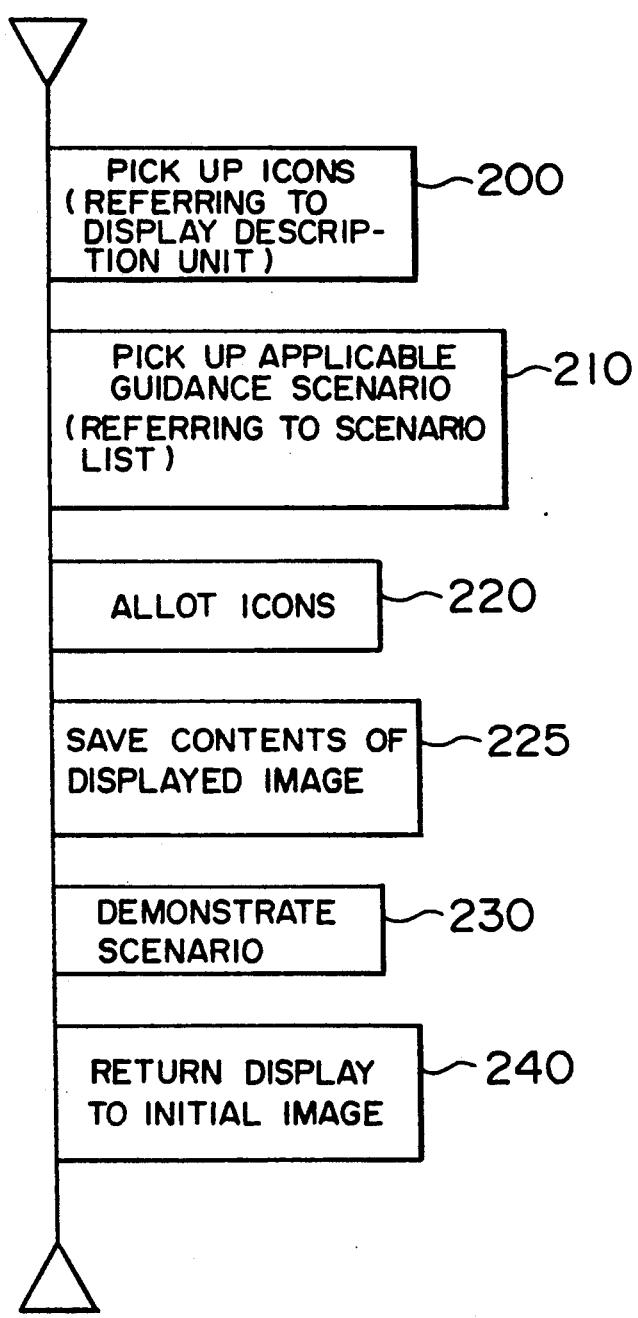
FIG. 4A is a flowchart showing the guidance process according to the first embodiment.

When the guidance function is actuated for the scissors icon 6, the guidance control program 105 will execute the guidance along the flowhcart as shown in FIG. 4A.

In processing 200, referring to the display description unit 103, icons displayed on the screen 3 are picked up to be listed. Namely, through this processing, the icons which can be used for the guidance function are provided for the reason that they are displayed on the screen.

In processing 210, referring to the scenario list 106, the guidance scenario corresponding to the icon designated by a user is picked up. In this case, an applicable guidance scenario is selected under the condition that all the icons required to execute the guidance scenario is included on the icon list provided in processing. The details of the guidance scenario will be described later.

In processing 220, the icon(s) required to execute the guidance scenario selected in processing 210 is allottted from the icon list provided in processing 200.

In processing 225, the information on the icon allotted in processing 220 out of the icons displayed on the screen are saved into the main memory 12 or the disk 13. In saving the displayed information in processing 225, the corresponding managing information is saved using the saved information management table 251 as shown in FIG. 4B and also the real data represented by the allotted icon(s) are saved into the main memory 12 or the disk 13. The saved information managing table 251 includes, for each of the allotted icons a display coordinate position 252, a display size 253, a pointer 254 to the icon pattern data, the size 255 of the icon pattern data to which the pointer 254 points, a pointer 256 pointing to the saving destination into which the real data represented by the icon at issue are saved, and the size 257 of the data pointed by the pointer 256. The pointers 254 and 256 can be represented, if the data are located in the main memory 12, by the address value therein, or if the data are located in the disk 13, by the corresponding file name. In the case where the icons are displayed in partial superposition, information on the depth of display can be added to the display position to manage the degree of superposition between the icons.

In processing 230, the guidance is demonstrated, using the icon(s) allotted in processing 220, in accordance with the guidance scenario provided in processing 210. This demonstration can be displayed in such a manner that the description in the display description unit 103 is renewed through the guidance control program 105. Also the data such as icons newly created in processing 230 are managed in a created information managing table which can be realized in the same form as the saved information managing table. The details of processing 230 will be described later.

In processing 240, upon completion of the demonstration in processing 230, the status of the screen 3 is returned to that when the guidance function is started by storing in the display description unit 103 the information saved in processing 225 and managed on the saved information managing table 251, and by erasing form the display description unit 103 the information newly created in processing 230 and managed on the created information managing table.

Figure 5A:
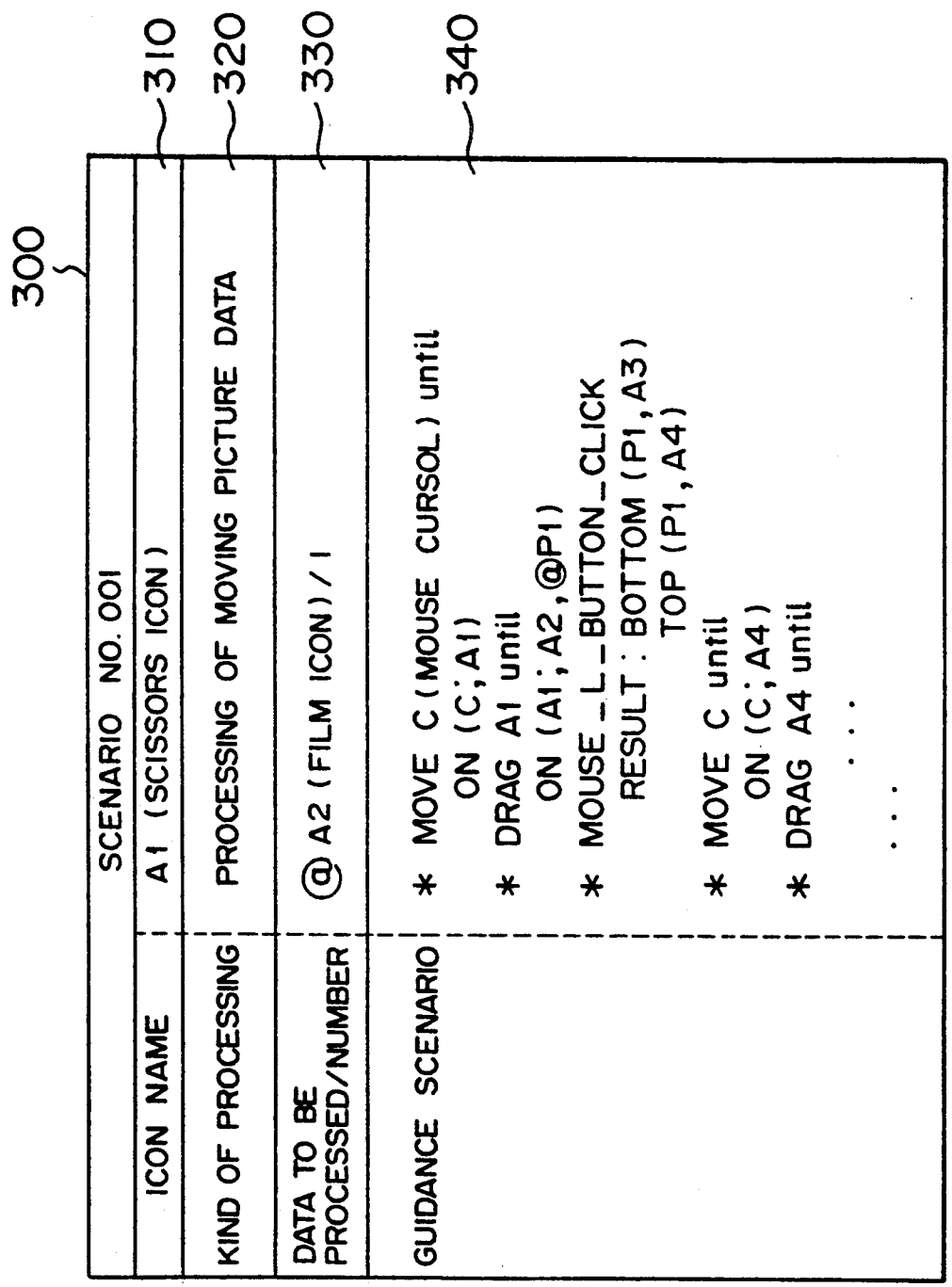
FIG. 5A is a view showing a guidance scenario.

Referring to FIG. 5A, explanation will be given for an example of data included in the guidance scenario stored in the scenario list 106 used by the guidance control program 105. The scenario list 106 includes a plurality of data such as scenario data 300, which are classified in terms of the name, kind, etc. of an icon for which the guidance is to be made.

Generally, it is assumed that the scenario data 300 consists of the name 310 of an icon at issue, the kind 320 of processing to be actually demonstrated in the guidance, the kind and number of data to be processed, and a guidance scenario 340.

Actually, the scenario data 300 shown in FIG. 5A consists of the following data.

310 describes that the name for which the guidance is to be executed is a scissors icon; this name is described as 'A1'.

320 describes that the processing actually executed in the guidance to be demonstrated is processing moving picture data.

330 describes that the data to be processed in the guidance is a film icon and its number is 1; the film icon is described as 'A2'. 340 describes the contents of the guidance scenario picked up.

The guidance scenario is picked up, in the processing 210 as mentioned above, in the following process. First, the guidance scenarios having the same name as the icon for which guidance is to be executed are selected by searching the icon names described in data 310. Subsequently, picked up among the guidance scenarios selected is the guidance scenario for which all the data described in data 310 are judged to have been displayed.

The symbol @ added to 'A2' designates that when the guidance control program 105 executes the processing 220 the icon being displayed is allotted for A2. This allotment is made using the icon selected from the icons usable for the guidance picked up in processing 200. If plural icons can be allotted for A2 as in the guidance scenario as shown in FIG. 5, the icon displayed nearest A1 on the screen 3, for example, may be allotted for A2.

Returning to FIG. 5A again, 340 describes the guidance scenario, i.e. the sequence or process of demonstrating the guidance. The commands labeled x are usually executed by a user using the input device such as the mouse 2; in demonstrating the guidance according to this embodiment, the guidance control program 105 acts for the user. The guidance control program 105 reads the guidance scenario 340 from the disk 13 to demonstrate the guidance function consisting of several processings. C designates the mouse cursor 4.

Figure 6A:
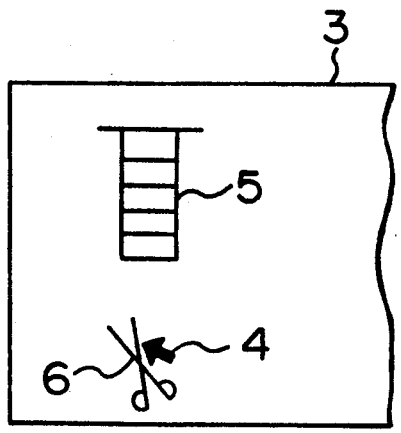
FIGS. 6A to 6F are views showing the movement on the screen while the guidance according to the first embodiment is demonstrated.

First, the program control program 105 performs the processing of MOVE of moving the mouse cursor 4 onto the scissors icon 6 as shown in FIG. 6A. This processing is usually executed by the user in a manner of manipulating the mouse 2. Now the guidance control program 105 acts for the user toe xecute this processing on only the screen 3; this appleis to the respective processings to be executed later. Further, 'ON (C; A1)' means that C is located on A1, and 'unitl . . . ' means that move until . . . . Thus, the MOVE processing is carried out until the mouse cursor 4 arrives on the scissors icon 6. The passage taken by the mouse cursor 4 can be automatically set by the guidance control program 105. For example, the mouse cursor can take a linear passage connecting its position before the position with the display position of the scissors icon 6.

Figure 5B:
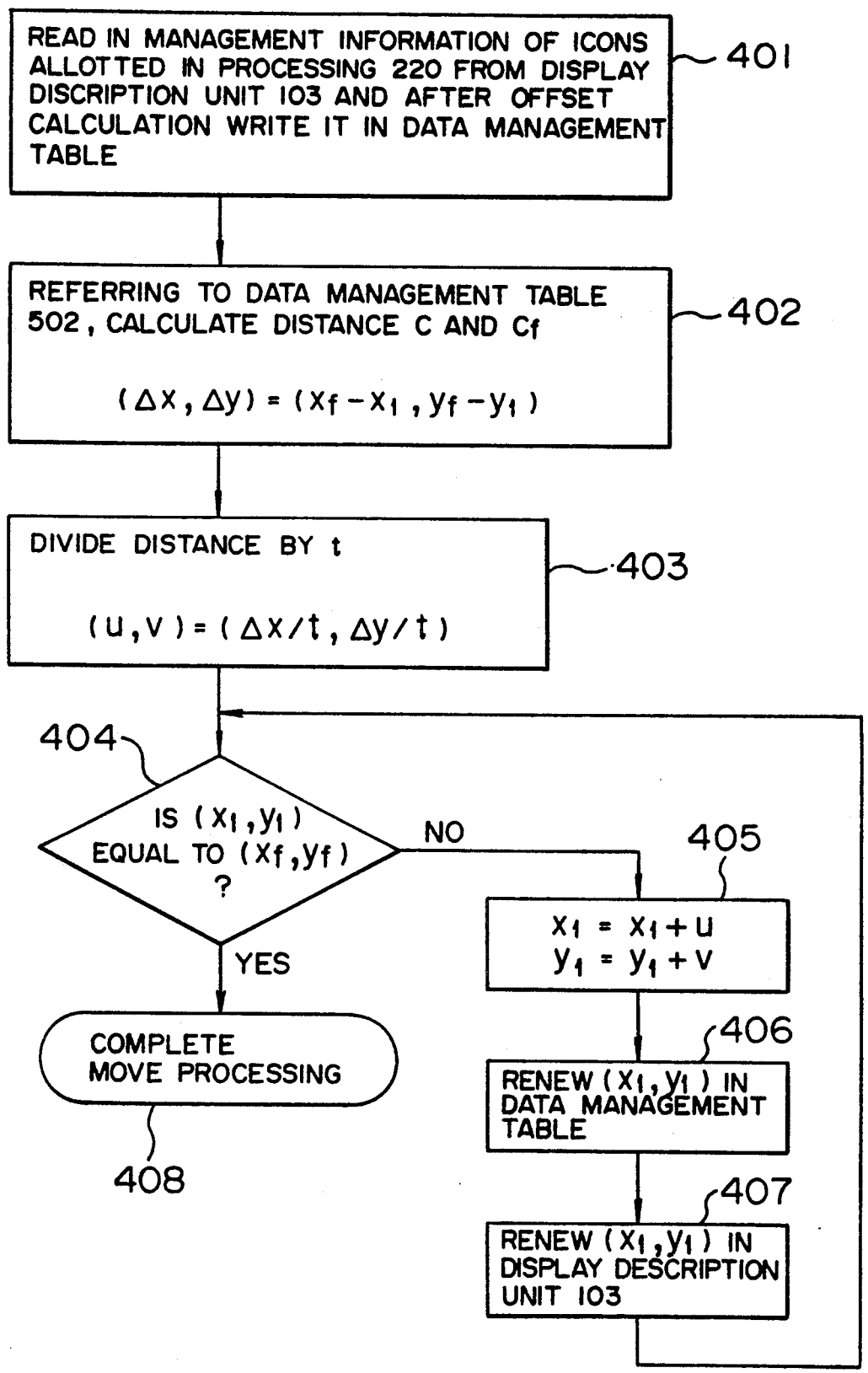
FIGS. 5B and 5E are flowcharts showing the MOVE processing in the guidance process of FIG. 4A.

The MOVE processing in processing 230 (FIG. 4A) executed through the guidance control program 105 will be explained in detail with reference to the flowchart as shown in FIG. 5B.

Figures 5C, 5D:
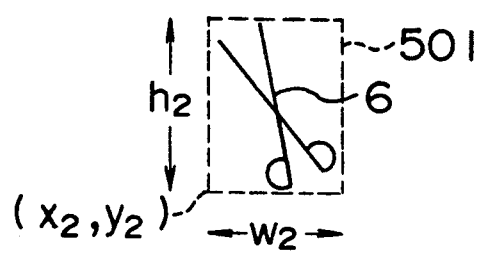
FIG. 5C is a view showing the definition of an icon.
FIGS. 5D and 5F are view showing data management tables.

In step 401, the management information of the icon allotted in processing 220 (FIG. 4A) is read from the display description unit and written of stored in a data management table 502 as shown in FIG. 5D. Specifically, the data management table 502 includes, for C and A1 which are the icons allotted in processing 220, the display positions (x1, y1) and (x2, y2) on the screen 3, respectively, and the sizes (w1, h1) and (w2, h2), respectively. The data management table 502 also includes, for the state Cf of C after the MOVE processing, its display position (xf, yf) calculated on the screen 3.

An example of the manner of calculating the display position (xf, yf) in step 401 will be described. The display position and the size of an icon can be defined as in connection with the scissors icon 6 as shown in FIG. 5C. Specifically, the display position of the scissors icon 6 can be defined as the coordinate value (x2, y2) of the circumscribed square 501 of the scissors icon displayed in its lower left corner on the screen 3, and the size of the scissors icon 6 can be defined as the width w2 and the height h2 of the circumscribed square thereof. Assuming that the state where the center point of the circumscribed square of C is superposed on that of A1 is Cf, its display position (xf, yf) can be calculated, using the display positions (x1, y1) and (x2, y2) and the sizes (w1, h1) and (w2, h2) of the icons C and A1, by the following equation $$xf = x2 + (w2/2) - (w1/2)$$

$$yf = y2 + (h2/2) - (h1/2)$$

If C contains an offset value as its attribute, the offset value is added to both the above equations so that the state where the center point of the circumscribed square of C and that of A1 are apart from each other by the offset value can be regarded as Cf.

In step 402, the distance ($\Delta x$, $\Delta y$) between C and Cf can be calculated by $$\Delta x = xf - x1; \Delta y = yf - y1$$

In step 403, ($\Delta x$, $\Delta y$) is divided by a constant t to provide (u, v). The value of t may be previously determined in the guidance control program 105 or may be set by a user.

In step 404, whether or not (x1, y1) and (xf, yf) are equal to each other is decided. If the answer is 'NO', the following steps 405, 406 and 407 are repeated.

In step 405, (u, v) is added to (x1, y1).

In step 406, (x1, y1) calculated in step 405 is written into the data management table 502 to renew (x1, y1) thereon.

In step 407, (x1, y1) is written into the display description unit 103 to renew (x1, y1) thereon. The display control unit 102 displays the contents described in the display description unit 103 so that the mouse cursor 4 is displayed at the position (x1, y1) calculated in step 405. The mouse cursor 4 will move on the screen 3 by repeating the steps 405 to 407.

When (x1, y1) becomes equal to (xf, yf), i.e. the center point of the circumscribed square of C is superposed on that of A1, the answer in step 404 is 'yes' so that the MOVE processing is completed in step 408.

In some cases, the other icon may be displayed on the passage taken by the mouse cursor 4 in the above embodiment. In this case, if another passage is selected so that it does not travel on the displayed icon, the user can more easily understand the guidance demonstrated. To this end, the MOVE processing executed in the processing 230 through the guidance control program 105 will be performed along the flowchart of FIG. 5E instead of that of FIG. 5B.

Figure 5E:
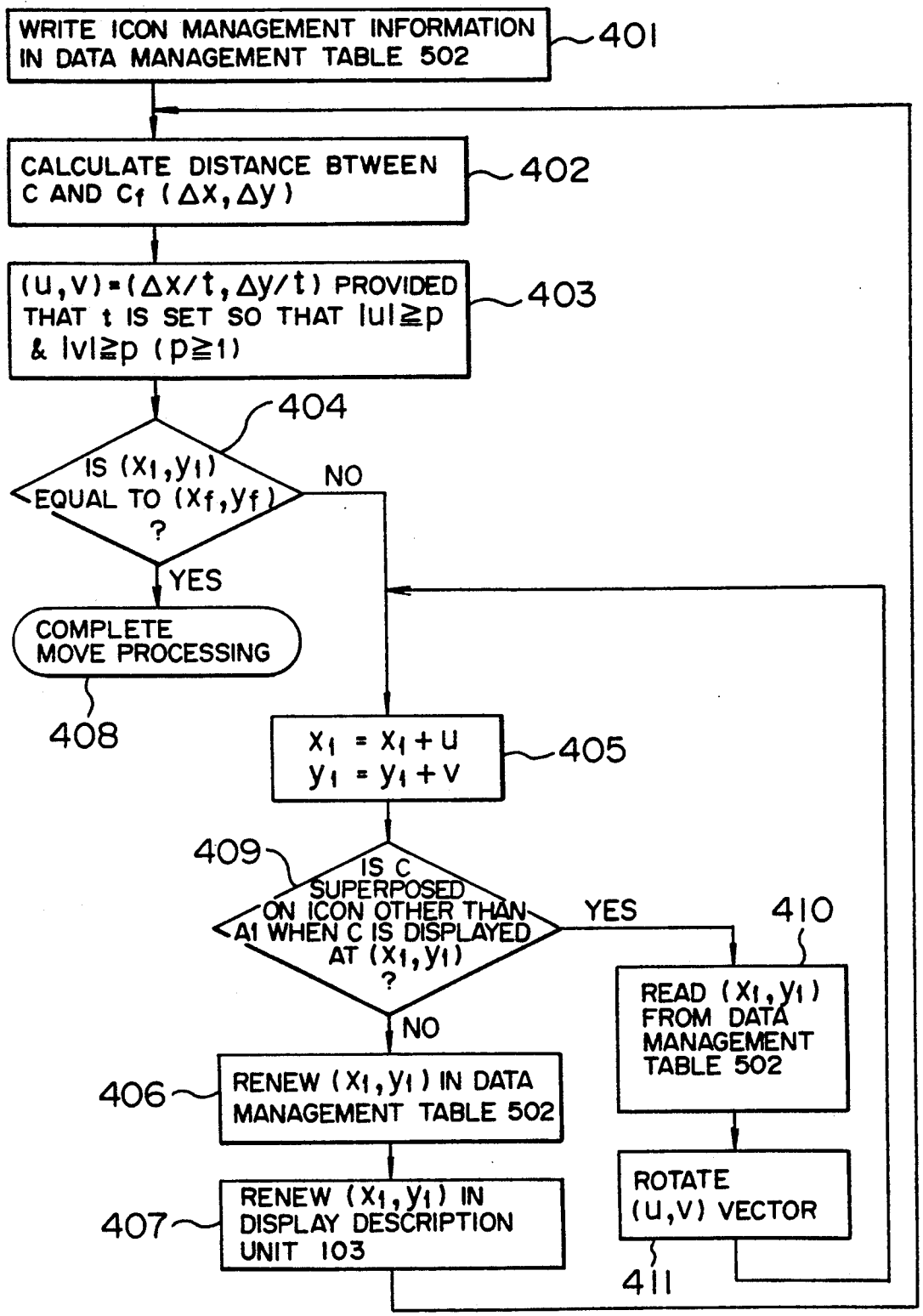

Steps 401 and 402 in FIG. 5E are the same as in FIG. 5B. Although step 403 in FIG. 5E is also the same as in FIG. 5B, the constant is set so that the absolute values of u and v are not smaller than a constant p which is not smaller than 1.

In step 404, whether or not (x1, y1) is equal to (xf, yf) is decided. If the answer is 'no', the following steps 405, 409, 406, 407, 410, 411, 402 and 403 will be performed. The steps 405, 406 and 407 are the same as in FIG. 4B.

In step 409, whether or not C, when it is displayed at (x1, y1) calculated in step 405, is superposed on the icon(s) other than A1 is decided. This decision can be made by examining whether or not the circumscribed square of each of the icons displayed on the screen 3, which can be calculated using their display position and size described in the display description unit 103, overlaps that of C.

If the answer in step 409 is 'no', after completion of steps 406 and 407, the process is returned to step 402.

On the other hand, if the answer in step 409 is 'yes', first, in step 410, the value of (x1, y1), i.e. the present display position of the mouse cursor 4 is read from the data management table 502. Subsequently, in step 411, the vector (u, v) is rotated by the angle predetermined in the guidance control program 205. Thereafter, the process is returned to step 405.

When (x1, y1) becomes equal to (xf, yf), i.e. the center point of the circumscribed square of C is superposed on that of A1, the answer in step 404 is 'yes' so that the MOVE processing is completed in step 408.

Although the process of moving the mouse cursor 4 on the linear passage was explained, the mouse cursor 4 may be moved on the passage other than the linear passage, e.g. a parabolic passage tracking above both of the mouse cursor 4 and the scissors icon 6.

Returning to the guidance scenario in FIG. 5A, the guidance control program 105 executes the DRAG process to drag the scissors icon 6. Now it is assumed that 'ON (A1; A2, @P1)' means that A1 is located on a point on A2. @ added to P1 means that the position of P1 is calculated using the method predetermined by the guidance control program 105; for example, the position of P1 is determined to be the center point of A2. P1 corresponds to (xf, yf) in a data management table 502 in FIG. 5F which can be calculated by the same processing as in step 401 in FIG. 5B.

Now referring to the flowchart of FIG. 5G, explanation will be given for the DRAG process executed in step 401 in FIG. 4A through the guidance control program 105. This flowchart shows the process of dragging the scissors icon 6 on a linear passage, and it is basically the same as the flowchart of FIG. 5B so that only differences therebetween will be explained below.

In step 401, the display position (x3, y3) and size (w3, h3) of A2 are also written on the data management table 502. P1 can be set at a break of the scene on the film icon 5 by adding the offset value in calculating (xf, yf); this offset value can be provided from the result output from the processing module for detecting a break of the scene of moving picture data.

In step 404, whether or not (x1, y1) is equal to (xf, yf) is decided. If the answer is 'no', the following steps 411, 412 and 413 are repeated.

In step 411, (u, v) is added to (x1, y1) and (x2, y2).

In step 412, (x1, y1) and (x2, y2) calculated in step 411 are written on the data management table 502 for their renewal.

In step 413, (x1, y1) and (x2, y2) calculated in step 411 are written in the display description unit 103 for their renewal. The display control unit 102 displays the contents described in the display description unit 103 so that the mouse cursor 4 and the film icon 5 are displayed at (x1, y1) and (x2, y2) calculated in step 411, respectively. When the steps 405 to 407 are repeated, the mouse cursor 4 moves on the screen 3 as if it were dragging the film icon 5.

When in step 404, (x1, y1) becomes equal to (xf, yf), i.e. C reaches P1, the answer is 'yes' so that the DRAG process is completed in step 414.

Figures 5F, 5G:
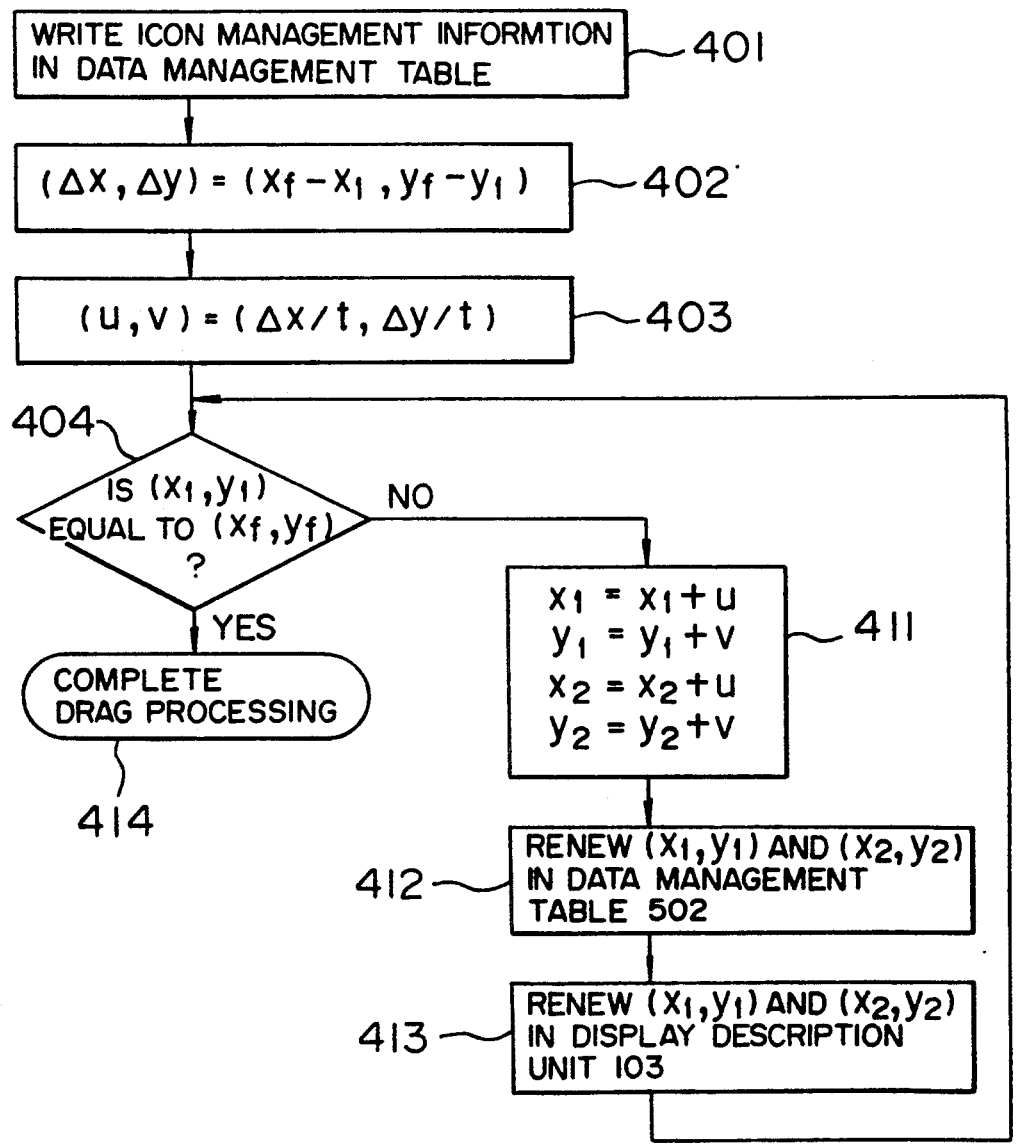
FIG. 5G is a flowchart showing the DRAG processing in the guidance process of FIG. 4A.

Additionally, by changing the flowchart of FIG. 5G in the same manner as changing the flowchart of FIG. 5B into that of FIG. 5E, the DRAG process in which the moving icon does not overlap the other icon displayed on the screen 3 can be realized.

Figure 6B:
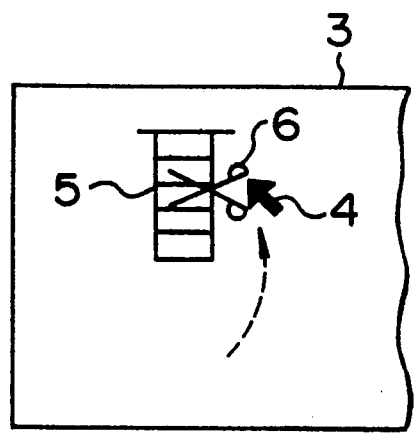

Thus, the display state of the screen as a result of the DRAG process becomes such as shown in FIG. 6B.

Figure 6C:
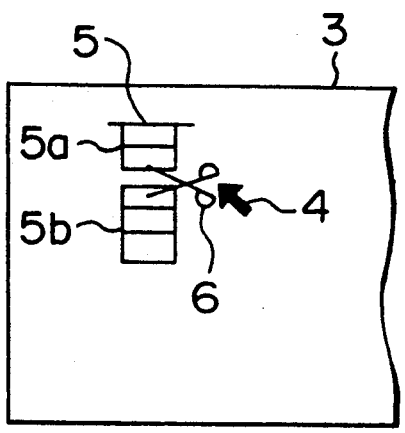

The subsequent process of MOUSE__L__BUTTON__CLICK in the guidance scenario in FIG. 5A serves to clicks the left button 2a of the mouse 2. The description of RESULT shows the result of the processing actuated by clicking the left button 2a of the mosue 2. Namely, BOTTOM (P1, A3) means that P1 lies at the bottom of A3, and TOP (P1, A4) means that P1 lies at the top of A4. More specifically, it is meant that as shown in FIG. 6C, an upper film icon 5a and a lower film icon 5b, which are formed when the scissors icon 6 cuts the film icon 5 into two parts at P1, are allotted for A3 and A4, respectively.

Figure 6D:
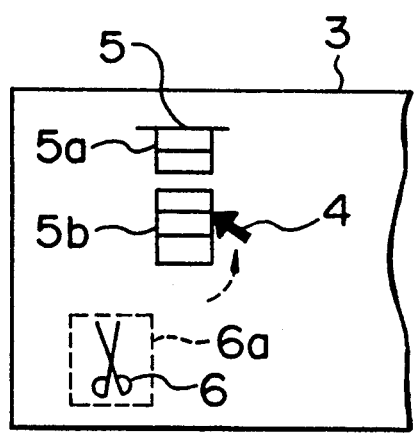

The MOVE process in the guidance scenario (FIG. 5A) moves the mouse cursor 4 onto A4, i.e. the film icon 5b as shown in FIG. 6D. Incidentally, although the scissors icon 6 has been released from the mouse cursor 2, the scissors icon 6 can be dragged to shift its display position to the regular position 6a.

Figure 6E:
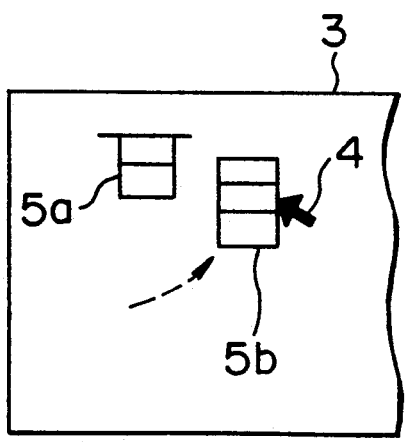

The DRAG process in the guidance scenario drags the film icon 5b to shift its display position as shown in FIG. 6E.

Until the predetermined guidance is completed, the guidance control program 105 demonstrates the guidance in processing 230 (FIG. 4A) in accordance with the description of the guidance scenario 340 (FIG. 5A), thus informing the user of a necessary manipulating method. After completion of the processing 230, in processing 240, the display on the screen 3 is subjected to a return processing so that it is automatically returned to the state when the guidance function is started. In this case, after completion of the demonstration in processing 230, the demonstration result may be displayed as it is for a predetermined time so that the display is returned to the above state after the predetermined time has passed. The length of the predetermined time can also be optionally set for each user.

Figure 6F:
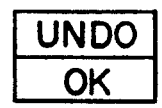

Otherwise, the pop-up menu as shown in FIG. 6F can be displayed so that the user can select the subsequent operation. In the case of FIG. 6F, if the item of UNDO is selected, the display on the screen 3 is returned to the state when the guidance function is actuated; if the item of OK is selected, the user can continue a usual operation from the display state formed by demonstration of the guidance. In this case also, the above time control can be made. Specifically, if the user does not select or selects the item of OK within a predetermined time, the display can be automatically returned to the initial state when the guidance function was actuated; the length of the predetermined time can be optionally set for each user.

Further, the guidance scenario being executed can include the other guidance scenario to be called and executed, or it can shift to the other guidance scenario. For example, if the guidance scenario 340 20 in scenario No. 1 includes the description of CALL scenario No. 2, the guidance control program 105 accesses scenario No. 2 and executes it. Also, if the guidance scenario 340 in scenario No. 1 includes the description of GOTO scenario No. 2, it can shift to scenario No. 2.

Now referring to FIG. 7, a system arrangement according to a second embodiment of the present invention will be explained. This embodiment is characterized in that a disk 13 includes a device display program 114 in addition to the programs and data included in the disk 13 shown in FIG. 1.

The device display program 114 has means for explaining to a user a method of manipulating an input device such as a mouse. For example, in order to demonstrate the dragging of the scissors icon 6, a mouse icon 10 is displayed on the screen 3. Thus, the user can also understand the method for manipulating the input device (mouse) so that the guidance for the user can more effectively realized. Timings of pressing the mouse button 2a can be explained for the user by changing the color, form or brightness of the button portion 10a of the mouse icon 10. For example, while the scissors icon 6 is being dragged, the mouse icon 10 is highlighted in such a manner that the color, form and brightness of its button portion 10a is changed. At this time, a buzzer may also be sounded and voice guidance may be added.

The processing requiring for a user to do a key board operation can be demonstrated as follows. When the guidance has entered the situation requiring a key board operation by the user, the device display program 114 displays a keyboard icon near a region of the screen 3 where a series of characters are to be input to display the series of characters as if they were successively input on the region. This manner, if the character cursor displayed in the region is highlighted by its blinking, can be more easily understood by the user. Further, the key portion of the key board icon may be highlighted in such a manner that the mouse button portion 10a of the mouse icon 10 are highlighted as described above.

Meanwhile there is a system provided with a touch panel permitting coordinate information or the like to be input by touching a user's finger or a stylus pen to the screen 3. A touching operation in this system is demonstrated as follows. For example, if the scissors icon is to be dragged by moving the user's finger touching to the scissors icon 6, the device display program 114 displays an icon in the form of a finger or arm in place of the mouse icon 10 to demonstrate the above dragging.

Figure 9A:
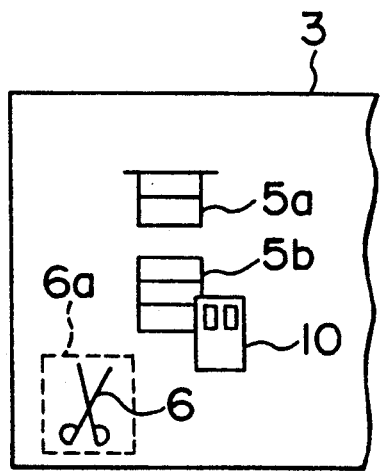
Figure 9B:
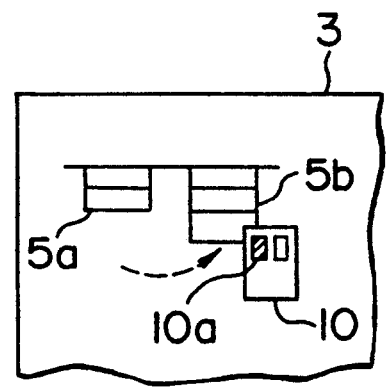

In the case where the device display program 114 displays the mouse icon 10 to demonstrate the guidance in accordance with the guidance control program 105, the guidance function can be actuated as follows. With the mouse icon 10 previously displayed on the screen 3 in accordance with the icon display program 113, the user drags the scissors icon 6 for guidance onto the mouse icon 10. Then, the mouse icon 10 starts to move together with the scissors icon 6 to actuate the guidance therefor as shown in FIGS. 9A and 9B. In accordance with the above manner of actuating the guidance function, the guidance actuation by a user is unified with the guidance demonstration in the system in the processing flow; this permits the user to easily to understand the guidance.

Further, if, after the mouse icon 10 has been moved onto the scissors icon 6, the user moves the mouse cursor 4 onto its mouse button portion 10a and then clicks the mouse button 2a, the scissors icon 6 can successively demonstrate the processing to be executed by the scissors icon correspondingly to the above mouse button operation. Thus, guidance for the processing corresponding to the specific user's operation for a certain icon can also be actuated.

FIGS. 9A and 9B show a part of the demonstration of the guidance when the device display program 114 is provided according to this embodiment. FIGS. 9A and 9B correspond FIGS. 6D and 6E previously described, respectively; the display of FIG. 9B informs the user of necessity of mouse manipulation. In response to the description of MOUSE-L-BUTTON-CLICK on the guidance scenario 340 (FIG. 5A), the device display program 114 causes the button portion 10a of the mouse icon 10 to glitter. In response to the processing corresponding to this operation, the guidance control program 105 demonstrates cutting the film icon 5.

While the guidance is demonstrated, the mouse cursor 4 can be displayed as it is on the screen 3 individually from the demonstration, or may be caused to disappear from the screen 3. Further, the mouse cursor 4 may be moved together with the mouse icon 10 under the condition that they are simultaneously displayed on the screen 3. In the example of FIGS. 9A and 9B, the mouse icon 10 is moved together with the film icon 5b for guidance on the screen 3. Otherwise, with the mouse icon 10 displayed at the regular position on the screen 3, only the mouse cursor 4 may be moved together with the scissors icon 6 for guidance. In this case, the display on the screen 3 is the same as the usual display when the guidance is not demonstrated except that the device display program 114 displays the mouse icon 10 in order to teach a user a method of manipulating the mouse button 2a.

FIG. 10 shows a system arrangement according to a third embodiment of the present invention. This embodiment is characterized in that the disk 13 stores sample 115 data such as image data and character series data in addition to the components of the disk 13 shown in FIG. 1.

In the first embodiment, the icon allotment 220 in the flowchart of FIG. 4A is directed to the film icon 5 which is user's own real data displayed on the screen 3 when the guidance function is actuated. On the other hand, in this embodiment, the sample data prepared by the system itself can be used for the icon allotment. Thus, even if all the icons required to demonstrate the guidance are not prepared in the icon extraction in the flowchart of FIG. 4A, the guidance scenario can be picked up in the scenario pick-up processing 210 using the sample data 115. Therefore, in the cases where the user's own real data displayed on the screen 3 are not suitable for the icon designated for guidance, and where no icon representative of data is still displayed on the screen 3, this embodiment permits the guidance to be always demonstrated in accordance with the user's requirement.

Figure 11:
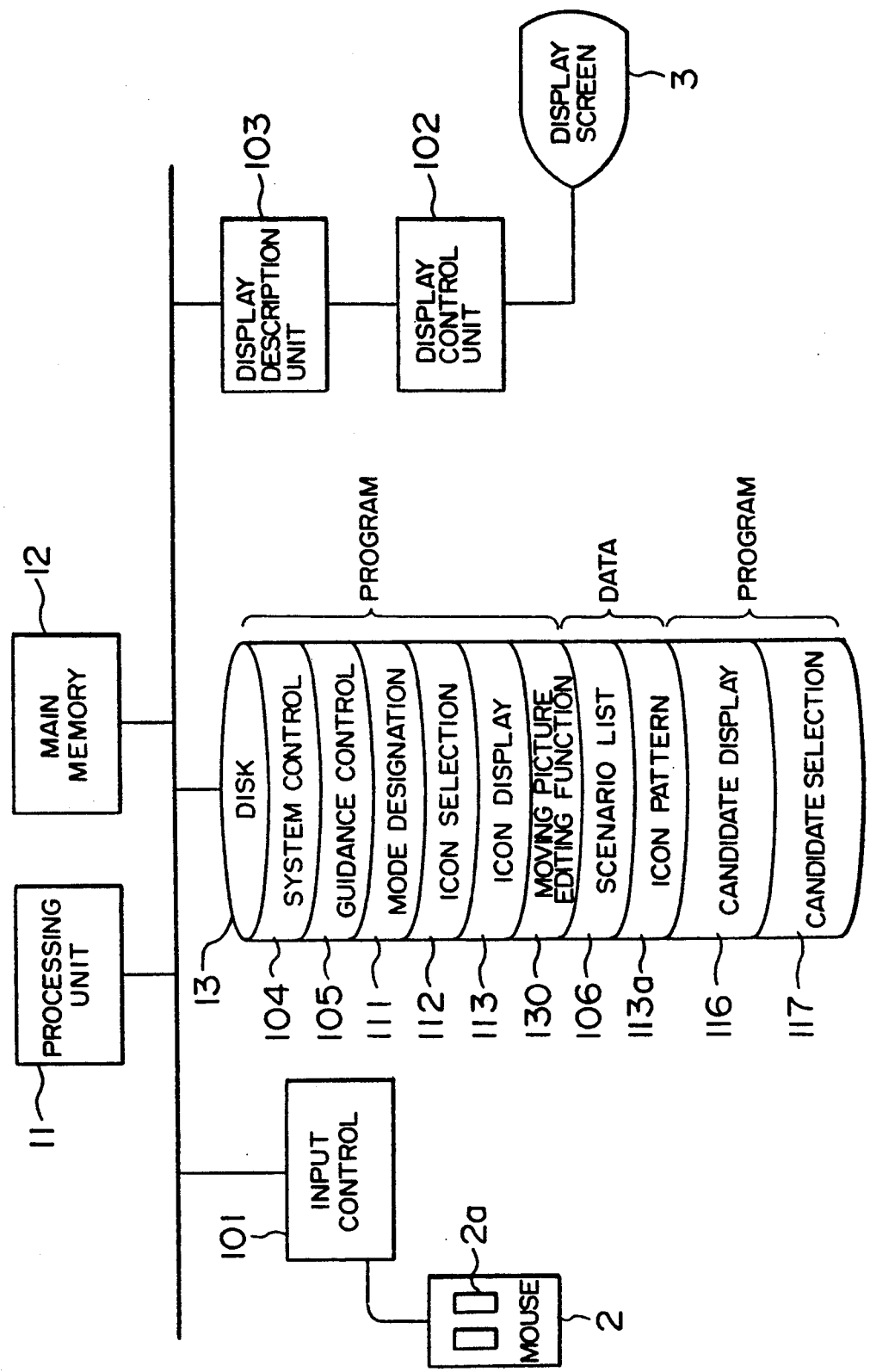

FIG. 11 shows the system arrangement according to a fourth embodiment of the present invention. This embodiment is characterized in that the disk 13 stores a candidate display program 116 and a candidate selection program 117 in addition to the components included in the disk 13 as shown in FIG. 1. In accordance with this embodiment, when plural guidance scenarios are picked up in the guidance scenario pick-up processing 10 in the flowchart of FIG. 4A, the scenario which is desired for a user to demonstrate can be selected from a scenario menu including applicable guidance scenarios.

Figure 12:
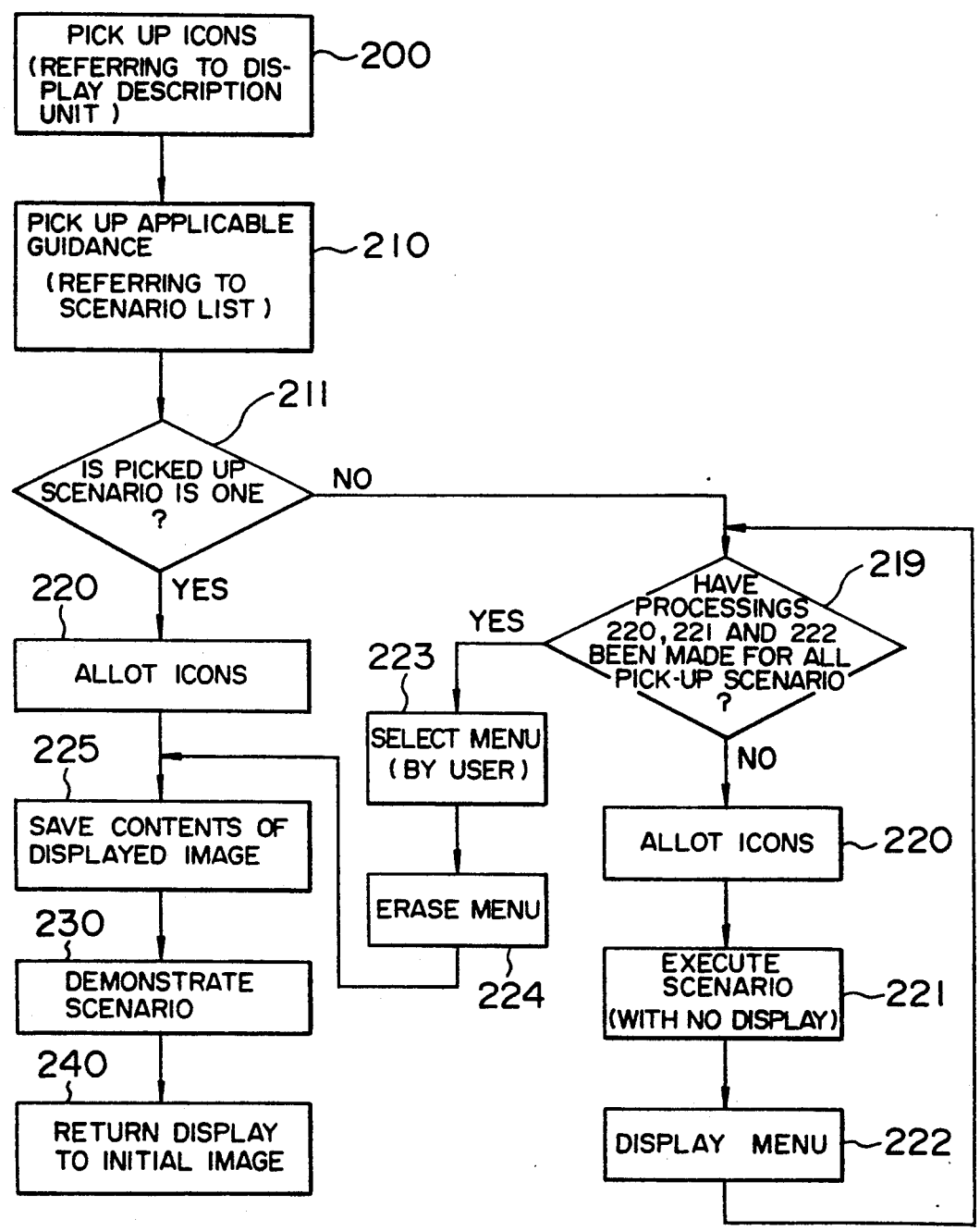
FIG. 12 is a flowchart showing the guidance process according to the fourth embodiment of FIG. 11.

Referring to the flowchart of FIG. 12, explanation will be given for the flow of the processings executed in the system arrangement according to the fourth embodiment of the present invention.

In processing 200, referring to the display description unit 103, the icons displayed on the screen are picked up to be listed.

In processing 210, referring to the scenario list 106, the gudiance scenario corresponding to the icon designated by a user is picked up. In this case, using the sample data 115 described in connection with the third embodiment shown in FIG. 10, in addition to the list of the icons formed in processing 200, the guidance scenario in which the sample data are required to use can be picked up.

In processing 211, branching is made in terms of the number of guidance scenarios picked up in processing 200. If its number is single, the flow branches to the side of 'yes'. Thereafter, the same guidance as in the first embodiment will be demonstrated.

If the number of guidance scenarios picked up in processing 211, the flow branches to the side of 'no'.

Figure 13:
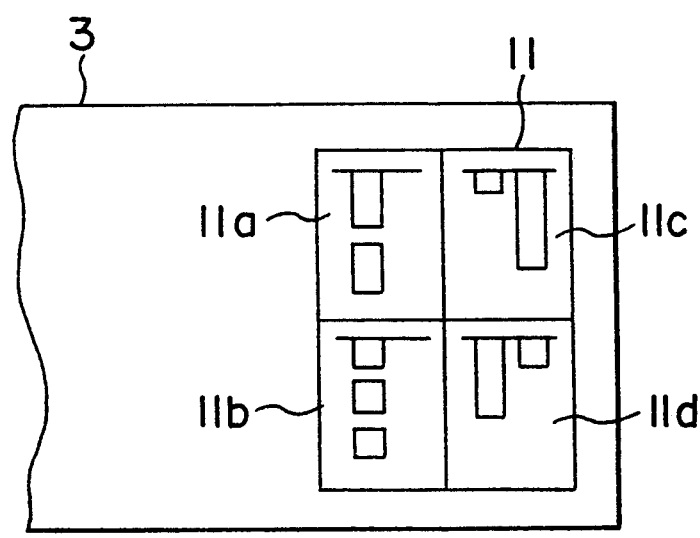
FIG. 13 is a view showing a menu displayed according to the present invention.

In processing 219, whether or not all the guidance scenarios picked up have been subjected to processings 220, 221 and 222 is examined. If the answer is 'no', in processing 220, an icon is allotted to the guidance scenario. In processing 221, the guidance scenario is executed using the icon allotted in processing 220. In this case, this execution is not demonstrated on the screen 3. In processing 222, in accordance with the candidate display program 116, the executing result in processing 221 is displayed as a menu 11 including guidance scenarios 11a to 11d as shown in FIG. 13.

If the answer is 'yes' in processing 219, in processing 223, upon reception of the report of the operation of the mouse 2 by a user, the candidate selection program 117 selects one of the guidance scenario execution results displayed from the menu 11.

In processing 224, the menu 11 is erased from the screen 3. Thereafter, the guidance on the selected execution result will be demonstrated as in the first embodiment.

In this embodiment, processings 221 and 222 may be also performed as follows. The execution process in processing 221 in progress may be displayed on the screen 3, and in processing 222, its result may be displayed on the menu 11. Otherwise, the execution process in processing 221 in progress may be displayed directly on the menu 11. The execution process in progress can be displayed at a high speed, and only important scenes thereof can be displayed disconnectedly. Further, the execution process in processing 219 in progress can be displayed directly on the menu 11 in the mode of displaying the plural processings in series or in parallel. The mode of displaying the menu 11 may be adapted so that it can be set by the user.

It should be noted that the scenario execution result selected from the menu 11 is not necessarily required to be demonstrated on the screen 3. It may be instantaneously reproduced on the screen 3 in the same state as its execution process. In this case, only important scenes of the process may be displayed. Thus, it is possible to obviate to repeatedly show the user the demonstration of the same processing in the scenario execution in progress. The system may be adapted so that the user can decide whether the scenario execution result selected from the menu 11 should be demonstrated.

Figure 14:
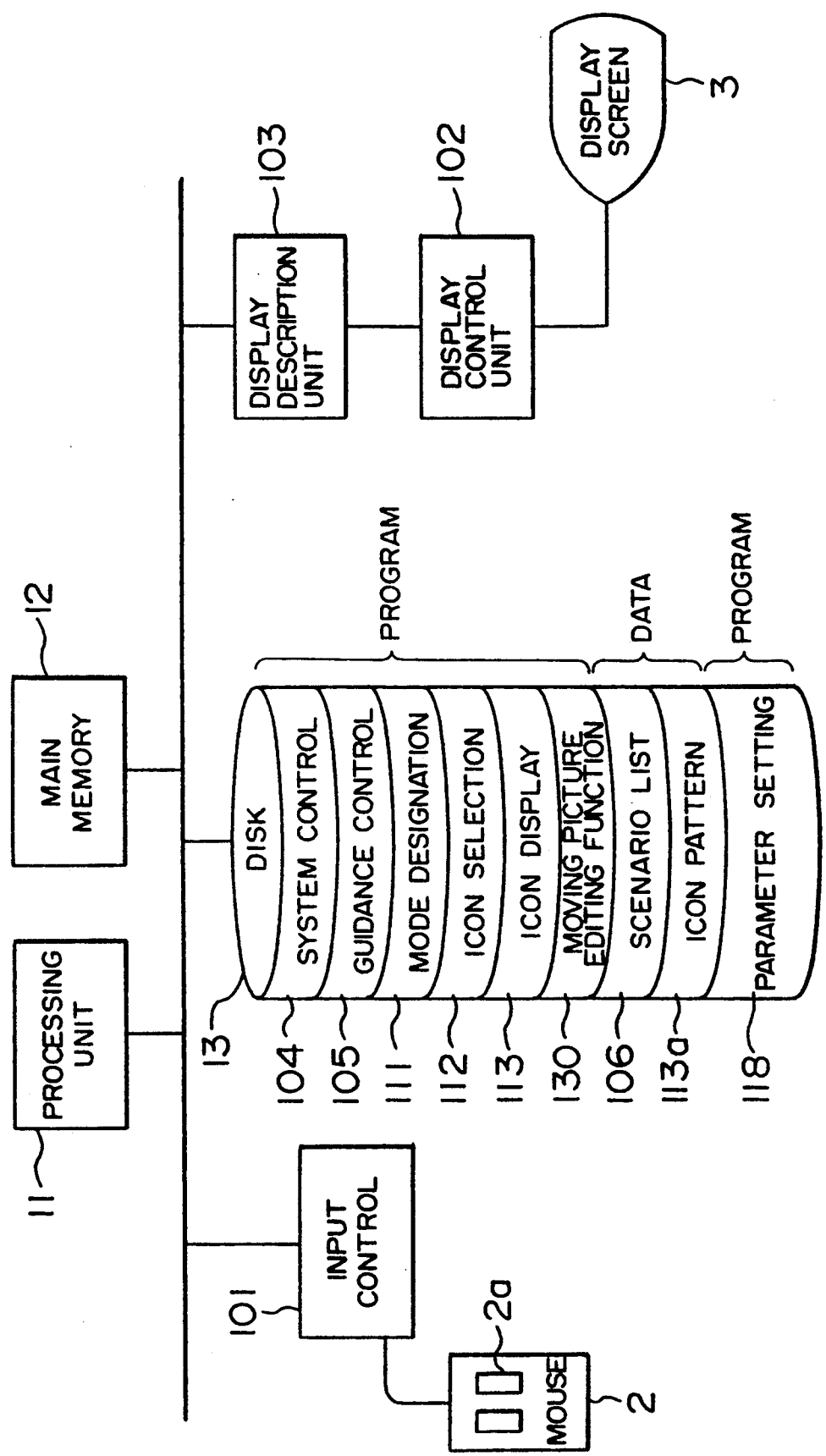
FIGS. 14 and 15 are block diagrams showing the system arrangements according to fifth and sixth embodiments of the present invention.

FIG. 14 shows the system arrangement according to a fifth embodiment of the present invention. This embodiment is characterized in that the disk 13 stores a parameter setting program 118 in addition to the components of the disk 13 as shown in FIG. 13.

The parameter setting program 118 serves to set the data such as positions of icons which must be set when the guidance control program 105 demonstrates the guidance scenario; these data are set their input by the user himself. Examples of these data are those labeled with * or @ in the guidance scenario 300 as shown in FIG. 5A.

Now referring to FIGS. 6A to 6E, explanation will be given for the display state on the screen 3 when the parameter setting program 118 sets @P1 in the scenario data 340 in FIG. 5A through the user's inputting operation. The parameter setting program 118, when the display state has become as shown in FIG. 6B, urges the user to adjust the position of the scissors icon 6 using the mouse 2. The user manipulates the mouse 2. Then, the contents of the manipulation are reported from the input control unit 101 to the parameter setting program 118. Upon reception of this report, the parameter setting program 118 moves the display position of the scissors icon 6. When the scissors icon 6 has been moved to the position where the film icon 6 is desired to be cut, the user clicks the mouse button 2a to continue the demonstration of the guidance. In this embodiment, the display position of the scissors icon 6 is adjusted by moving it in a vertical direction only along the film icon 6. This adjustment can be made in such a manner that the parameter setting program 118 disregards the horizontal component of the information on the manipulation of the mouse 2 received from the input control unit 101. Therefore, even if the user moves the mouse 2 in the horizontal direction, the information thereon is not adopted as an input, but only the information in the vertical direction is adopted as an input. Thus, the user can easily manipulate the mouse 2. Incidentally, in place of using the mouse 2, the arrow key on a key board may be used. In this case also, the parameter setting program 118, upon reception, from the input control unit 101, of a signal indicative of the fact that the arrow key has been pressed, moves the display position of the scissors icon 6.

The data which the user is urged to input by the parameter setting program may be not only the coordinate data input through mouse manipulation but also a series of characters and numerical data.

Also in the case where there are plural icons which can be processed in the demonstration for the icon actuated for guidance, it is possible to urge the user to select the icons to be processed. In this case, the icons to be selected can be displayed by enhancing their brightness so that the user can easily decide them.

Figure 15:
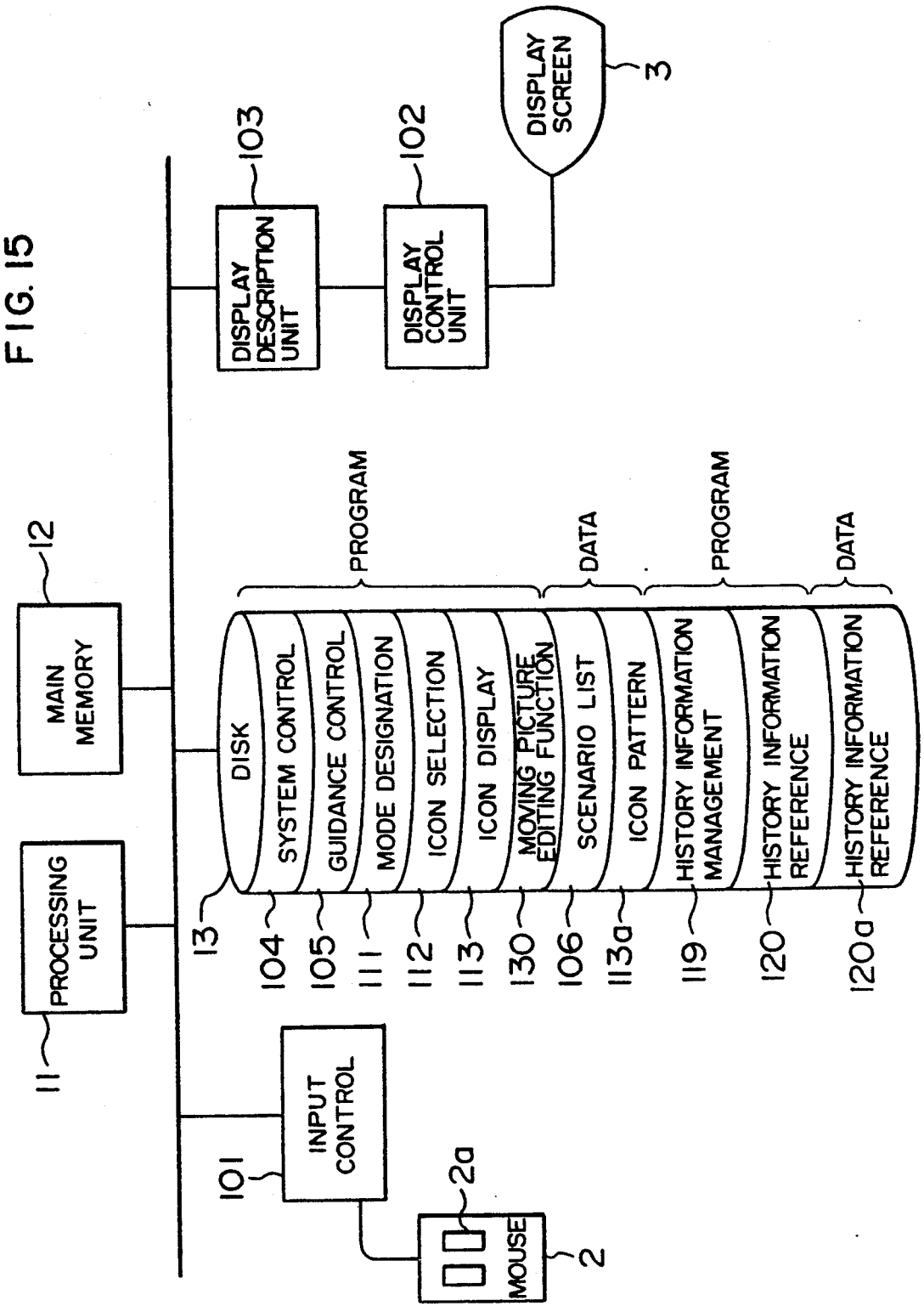

FIG. 15 shows the system arrangement according to a sixth embodiment of the present invention. This embodiment is characterized in that the disk 13 stores a history information management program 119, a history information reference program 120 and history information 120a in addition to the components of the disk 13 as shown in FIG. 1.

The history information management program 119 serves to manage the user's manipulation history stored as the history information 120a. The user's manipulation history includes the kind of function used by the user, the frequency of using the function, and the skill degree of the user for the system deduced from the frequency of using the system and the total time of using the system. The history information management program 119 also decides whether or not each of the scenario data included in the scenario list 106 has been used for demonstration of the guidance.

Referring to the history information 120a, the history information reference program 120 executes the following controls.

In the fourth embodiment described in connection with FIG. 11, the candidate display program 116 presents all executable guidance scenarios onto the menu 11 (FIG. 13) and the candidate selection program 117 causes the user to select one of the scenarios. On the other hand, in this embodiment, referring to the history information 120a, the history information reference program 120 permits the system to automatically select the guidance scenario to be demonstrated or limit the candidates thereof; the candidate display program 116 can display the candidate(s). This will be described in detail below.

Now it is assumed that the guidance function has been actuated for the scissors icon 6, and four kinds of scenarios for explaining the operation of the scissors icon 6 are prepared as processings A, B, C and D arranged from an easy one in the order of assumed difficulty. If the history information 120a includes the information that the scenarios corresponding to the processings A and B have already been presented to the user, on the basis of this record, the history information reference program 120 issues a command to the guidance control program 105 that it should execute the processing C. That the processing C has been executed is recorded on the history information management program 119 and so the history information 120a. Thereafter, when the guidance function is actuated for the scissors icon 6, the processing D will be executed.

Thus, the demonstration according to the same guidance scenario is not repeatedly presented for the user so that a waste of time can be obviated. Further, the history information 120a can previously record the information whether or not the function explained by each guidance scenario has been correctly used by the user. If the function has been correctly used, explanation on the function can be omitted, thereby realizing a more improved guidance function.

Further, if the system according to this embodiment also includes the candidate display program 116 and the candidate selection program 117, the guidance control program 105 presents to the menu 11 only the processings which are not still executed for the user. Such limitation can reduce the number of candidates displayed on the menu 11 so that the user can easily select the guidance scenario to be demonstrated. If that limitation excludes from the menu 11 the scenario(s) which the user desired to see, the system can be adapted so that the excluded scenario can be presented in accordance with the user's requirement. In this case, if the excluded scenarios are provided with priority orders, it is possible to present the scenarios in accordance with the user's requirement in order from the scenario having a higher priority. Thus, the probability capable of earlier selecting the scenario which the user desires to see.

Figure 16:
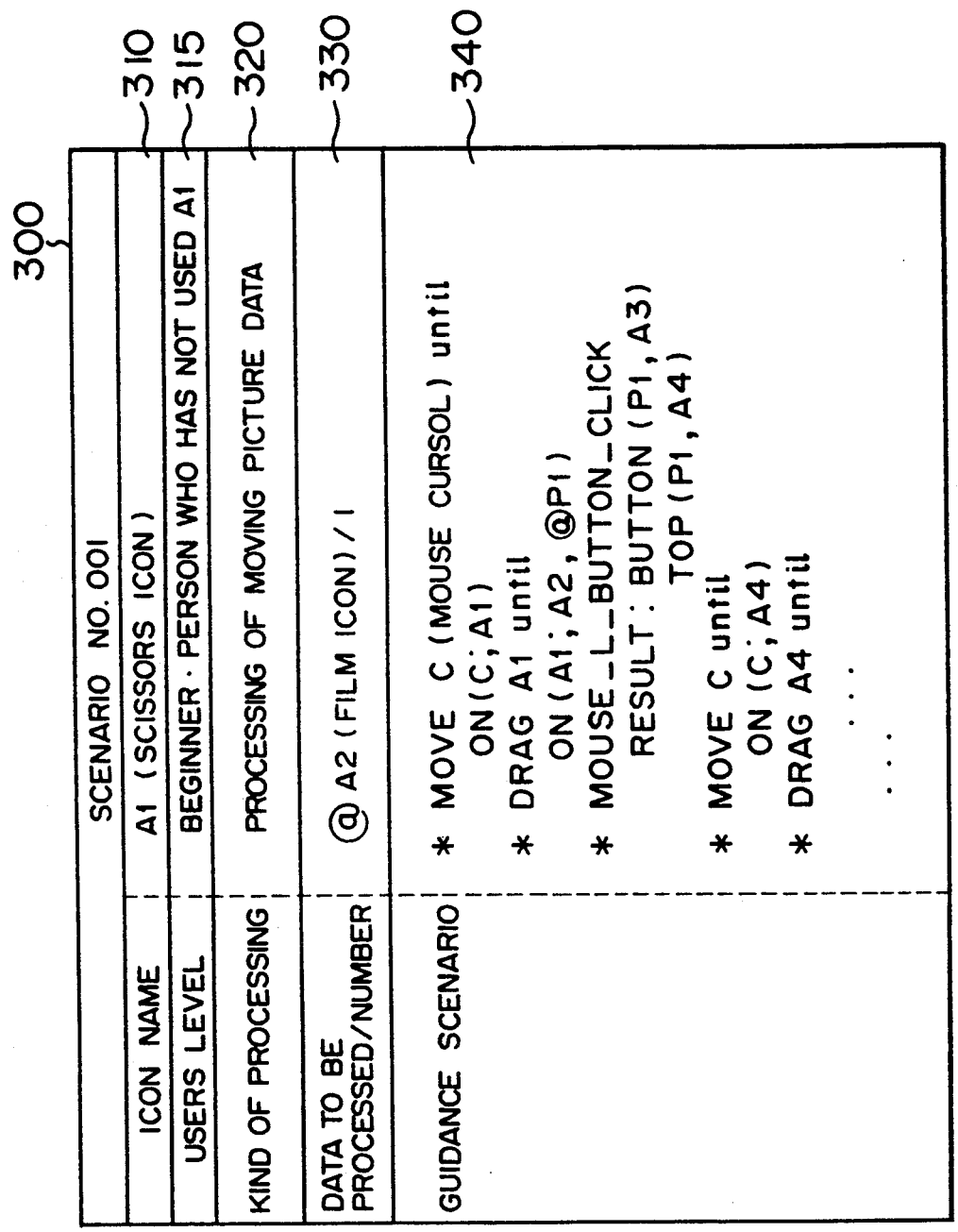
FIG. 16 is a view showing a guidance scenario.

FIG. 16 shows an example of scenario list 106 used when the guidance control program 105 executes the demonstration on the basis of the history information 120a referred to by the history information reference program 120. This scenario list 106 includes the level 315 of a user who is an object for guidance demonstration as scenario data. Now it is described that the guidance demonstration is executed for a beginner who has not used the scissors icon (A1).

The scenario list 106 includes a plurality of sets of data such as scenario data 300. The history information reference program 120 can automatically select the scenario data in accordance with the user's skill degree for the system included in the history information 120a, thereby executing the guidance demonstration.

Further, it is possible to vary the speed of the guidance demonstration in accordance with the user's skill degree for the system. The guidance demonstration of the explanation on basic operations may be omitted in accordance with the user's skill. For example, detailed demonstration of dragging icons may be omitted and the display positions of the icons have only to be jumped.

If the history information 120a includes the record of frequency of accessing or using icons, the history information reference program 120 can refer to this record. Therefore, if there are plural icons which can be allotted in processing 220 in FIG. 4, the icon having the highest frequency of use can be allotted. Thus, the guidance function is applied to the icon which playing the most important role in the user's operation; this is very convenient for the user.

Figure 17:
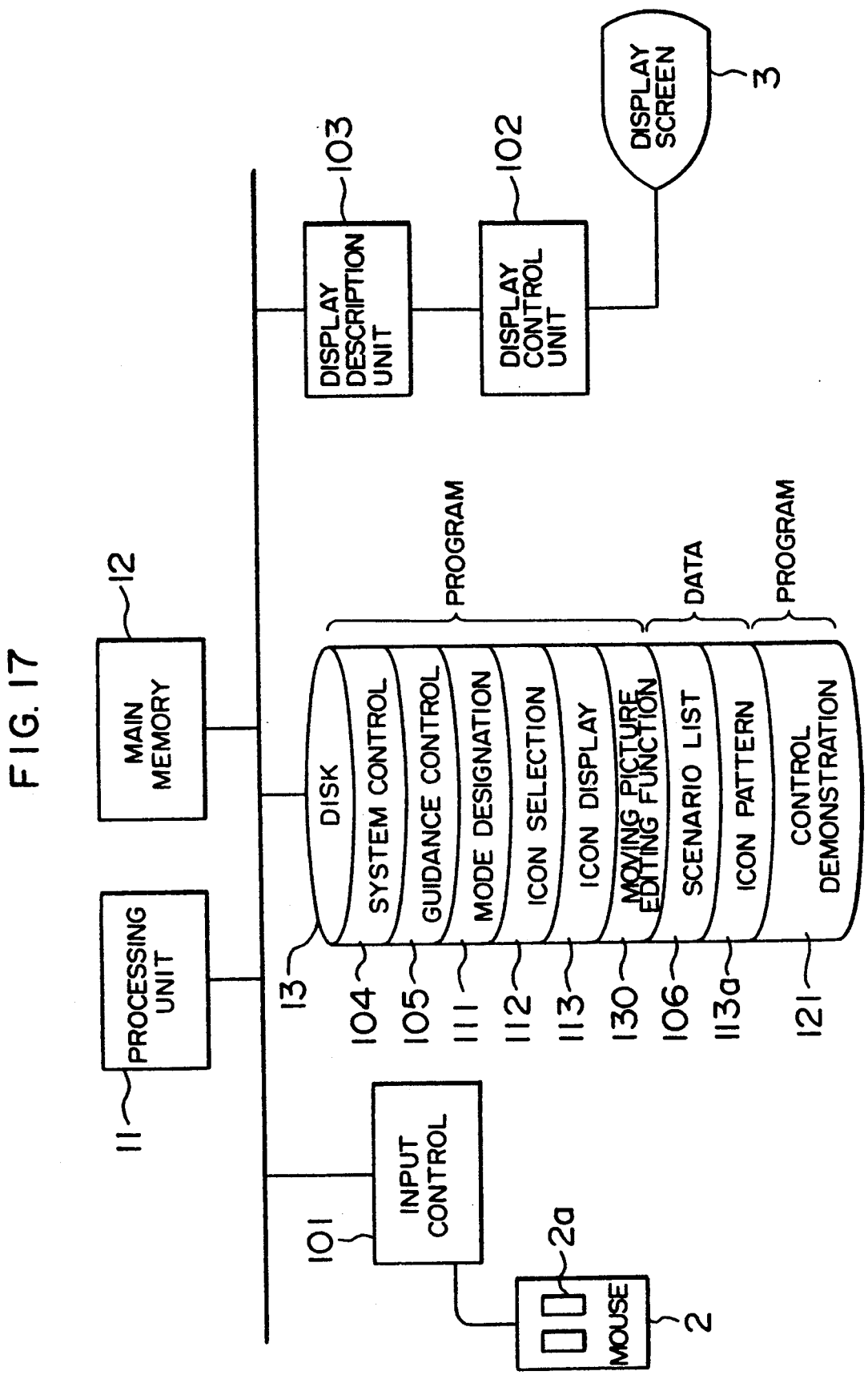
FIG. 17 is a block diagram showing the system arrangement according to a seventh embodiment of the present invention.

FIG. 17 show the system arrangement according to a seventh embodiment of the present invention. This embodiment is characterized in that the disk 13 stores a demonstration operation program 121 in addition to the components stored in the disk 13 in FIG. 1.

Figure 18:
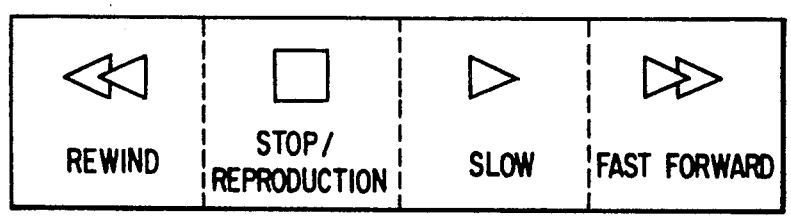
FIG. 18 is a view showing a menu displayed according to the present invention.

The demonstration operation program 121 serves to display on the screen 3 a video manipulation menu formed in imitation of the operation panel of a video deck as shown in FIG. 18. A user manipulates this video manipulating menu to control the guidance demonstration in accordance with the present invention.

Now it is assumed that in processing 240 in FIG. 4A, the pop-up menu shown in FIG. 6F is displayed and also the video manipulation menu is displayed in according to the demonstration operation program 121. Then, if the user designates 'rewinding' on the video manipulation menu to return the display on the screen 3 to any desired scene and thereafter selects 'OK' on the pop-up menu of FIG. 6F, a usual operation can be resumed from the desired scene. Also, any desired scene of the demonstrated scenario can be demonstrated again at a normal or slowmotion speed.

Further, if the system is constructed so that the processing corresponding to the demonstration in progress is displayed on the menu 11 as shown in FIG. 13, by designating one scene from the menu 11, the user can instantaneously return to the designated scene. Further, the menu 11 as shown in FIG. 13 can be combined with the video manipulation menu according to the embodiment. In this case, the user first selects from the menu 11 the scene nearest the desired scene; then he can return to the desired scene by only fine adjustment of the video manipulation menu.

Further, if the video manipulation menu as shown in FIG. 18 is displayed in actuating the guidance function, the user can control the speed and/or direction of the demonstration at any timing during the guidance demonstration.

Figure 8:
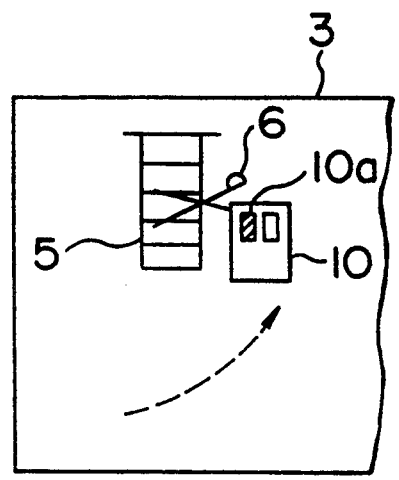
FIG. 8 and FIGS. 9A and 9B are views showing the operation on the screen in starting the guidance according to the first embodiment.

Further, the system can also be constructed so that the user can intervene in the guidance demonstration at any timing without displaying the video manipulation menu. For example, it is now assumed that the display is in the state where the scissors icon 6 has been dragged by the mouse cursor 4 as shown in FIG. 8. Then, if the user presses the mouse button 2a, hereafter, the movement of the scissors icon 6 is controlled by movement of the mouse 2 manipulated by the user so that the film icon 5 can be cut at a desired position. Incidentally, if the mouse icon 10 is erased from the screen 3 when the user presses the mouse button 2a, the user can easily understand that the right of continuing the guidance demonstration has been moved to the user. Therefore, if the user has understood the contents of the operation at issue during the guidance demonstration, he can immediately resume an actual operation.

Further, it is now assumed that the system is constructed so that the mouse cursor 4 can be moved using the mouse 2. In this case, if the user designates an interruption on the menu prepared for interrupting the guidance on the screen 3, he can set an interruption for the guidance function. This interruption can also be set in such a manner that the user presses a key previously allotted such as a function key on a keyboard.

The embodiments hitherto explained can be easily combined. For example, the system can be constructed to include the device display program 114 in the second embodiment of FIG. 7 and also the history information management program 119 and the history information reference program 120 in the sixth embodiment of FIG. 15. In this system, the history information reference program 120 refers to the history information management program 119 to deduce the skill degree of a user, and on the basis of this result, the device display program 114 changes the displaying manner of a device in accordance with the skill level of the user. For example, if the user is a beginner, the device display program 114 displays the mouse icon 10 and also executes the guidance by voice including buzzer. If the user is a master, the movement of the mouse icon 10 representative of simple operations for the mouse 2 is not required to be displayed. Further, in order to inform the user of the portion to which the user's attention should be paid, the brightness of that portion may be enhanced with the remaining portion being darakened. This can be controlled by describing on the guidance scenario 340 the portion to which attention should be paid and a parameter (e.g. radius of a circle) of designating the region the brightness of which should be changed. The portion to which attention should be paid may be displayed in an enlarged scale as if it were enlarged by a magnifying glass. The enlarged scale display and the varied brightness display may be combined. It is convenient for a beginner user that the guidance function can inform the user of the portion to which attention should be paid.

The scenarios to be included in the scenario list 106 can be prepared in terms of many viewpoints including a manner of using the scenario, contents of its processing and the media to be processed. Also, the ssytem can be constructed so that in processing 210 (FIG. 4A), the scenario can be picked up in terms of many viewpoints.

For example, with respect to the scenario for explaining how to use the scissors icon 6, different scenarios are required for the cases where the film icon 5 is to be cut into two pieces and three or more pieces. Further, different scenarios are required for the cases where only the cutting process is to be demonstrated and a typical processing following the cutting process is to be demonstrated. These scenarios can be selected by the candidate display program 116 and the candidate selection program 117 in the fourth embodiment of FIG. 11, the history information management program 119 and the history information program reference program 120, or combination of these programs.

The embodiments hitherto described were explained for only the guidance scenario of cutting on a time base the moving picture data represented by the film icon 6 using the scissors icon 6. However, if the scissors icon 6 is to be used to process other media, the corresponding scenarios are prepared for scissors icon 6. For example, these scenarios are a scenario of spacially cutting out a still image, a scenario of cutting out a series of characters, etc, which represent versatility in processing relative to the same icon. Further, also in the case where the same medium is to be processed, the same icon can represent plural processings. For exmaple, the case where the scissors icon 6 is to process the moving picture data includes several processings of cutting-out on a time base, spacial cutting-out, etc. the explanation of which should be demonstrated. In such a case, the corresponding scenarios are prepared. These scenarios can be selected by the candidate display program 116 and the candidate selection program 117 in the fourth embodiment of FIG. 11, the history infroamtion management program 119 and the history information program reference program 120, or combination of these programs.

What is claimed is:

1. A guidance method for use in a computer system the method comprising the steps of:
    actuating a guidance function corresponding to an icon designated by a user;
    automatically forming a list of icons being displayed on a display screen;
    automatically selecting a guidance scenario from a scenario list of the system corresponding to the icon designated by the user said guidance scenario being prepared for the purpose of explaining function and usage of said icon;
    allotting to said selected guidance scenario icons from said icons in said list of icons; and,
    demonstrating said selected guidance scenario by using said icons allotted.

2. A guidance method according to claim 1, wherein said demonstrating step comprises a step of initiating and controlling a display of an icon representing an input device in order to explain manipulation of said input device.

3. A guidance method according to claim 2, wherein said displaying step comprises the step of changing a display state of a portion which is required to operate said icon of the input device.

4. A guidance method according to claim 1, wherein said allotting step comprises the step of allotting an icon from sample data prepared in the form of a sample icon or from said icon list.

5. A guidance method according to claim 1, wherein said demonstrating step comprises the steps of:
    previously displaying a menu consisting of scenes representative of demonstrating progress or a scene of a final result of the demonstration and prompting a user to select one of said scenes; and,
    demonstrating the processing corresponding to said selected scene.

6. A guidance method according to claim 1, wherein said demonstrating step comprises the step of prompting a user to input a designation from the user when it is required during the demonstration.

7. A guidance method according to claim 1, wherein said demonstrating step comprises the steps of:
    examining a history of manipulation of a user; and demonstrating the guidance in accordance with the user's level on the basis of the history.

8. A guidance method according to claim 7, wherein said icon allotting step comprises the steps of:
examining use frequency of each of the icons used by the user who has required the guidance; and
allotting the icons in an order to the use frequency starting from the icon having the highest use frequency.

9. A guidance method according to claim 1, wherein said demonstrating step comprises the steps of:
examining a history of manipulation of a user;
displaying as a menu, on the basis of said history, guidance contents which have not been demonstrated;
prompting the user to select one of the guidance contents; and
demonstrating the selected guidance contents.

10. A guidance method according to claim 8, wherein said icon allotting step comprises the steps of:
examining use frequency of each of the icons used by the user who has required the guidance; and
allotting the icons in an order of the use frequency starting from the icon having the highest use frequency.

11. A guidance method according to claim 1, wherein said demonstrating step comprises the steps of:
displaying a manipulation menu capable of designating display speed of the demonstration and direction of the display; and
executing said demonstration on the basis of the designation contents selected by the user from said manipulation menu.

12. A guidance method according to claim 1, wherein the demonstrating step graphically displays movements of the allotted icons on the display screen as the icons interactively perform designated processes of said icons according to the guidance scenario.

13. A guidance apparatus in a computer system the apparatus comprising:
mode designating means for designating a guidance mode concerning an icon designated by a user;
means for displaying icons on a display screen;
forming means for forming a list of icons displayed on the display screen;
a guidance scenario having programmed manipulation contents;
selecting means for selecting the guidance scenario from a scenario list of the system corresponding to said designated icon;
allotting means for allotting to said selected guidance scenario icons from the icons in the list of icons; and,
demonstrating means for demonstrating said selected guidance scenario by using said icons allotted.

14. A guidance method according to claim 13, wherein said demonstrating means comprises means for initiating and controlling a display of an icon representing an input device in order to explain the manipulation of said input device.

15. A guidance method according to claim 14, wherein said means for displaying said input device icon comprises means for changing a display state of a portion which is required for manipulation.

16. A guidance method according to claim 13, further comprising means for storing sample data in the form of icons, wherein said icon allotting means comprises means for allotting icons from said sample data or from said icon list.

17. A guidance method according to claim 13, wherein said guidance scenario demonstrating means comprises means of previously displaying as a menu results of the demonstration in progress or a final result thereof; and
means for executing the demonstration contents selected from said menu.

18. A guidance method according to claim 13, wherein said guidance scenario demonstrating means comprises means for urging a user to input designation if his designation is required during the demonstration.

19. A guidance method according to claim 13, wherein said guidance scenario demonstrating means comprises:
means for storing a manipulation history of a user; and
means for selecting guidance contents in accordance with a user's skill level on said history, and demonstrating the selected guidance contents.

20. A guidance apparatus according to claim 19, wherein said icon allotting means comprises:
means for examining use frequency of each of the icons; and
means for allotting the icons in order of the use frequency starting from the icon having the highest use frequency.

21. A guidance apparatus according to claim 13, wherein said guidance scenario demonstrating means comprises:
means for storing a manipulation history of a user;
means for displaying as a menu on the basis of said history guidance contents which have not been demonstrated yet; and
means for demonstrating the guidance contents selected from the menu.

22. A guidance apparatus according to claim 20, wherein said icon allotting means comprises:
means for examining use frequency of each of the icons; and
means for allotting the icons in order of the use frequency starting from the icon having the highest use frequency.

23. A guidance apparatus according to claim 13, wherein said guidance scenario demonstration means comprises:
demonstration manipulation means for designating display speed of the demonstration and/or direction of the display; and
means for executing said demonstration on the basis of the designation contents selected by the user using said demonstration manipulation means.

24. A guidance apparatus according to claim 23, wherein said demonstration manipulation means comprises means for designating to demonstrate any desired scene during the demonstration again.

25. A guidance apparatus according to claim 13, wherein the demonstrating means graphically displays movements of the allotted icons on the display screen as the icons interactively perform designated processes of the icons according to the guidance scenario.

* * * * *

UNITED STATES PATENT AND TRADEMARK OFFICE
CERTIFICATE OF CORRECTION

PATENT NO. :     5,235,679

DATED       :     August 10, 1993

INVENTOR(S) :    Satoshi Yoshizawa, et al.

It is certified that error appears in the above-identified patent and that said Letters Patent is hereby corrected as shown below:

Claim 14, column 21, line 56, delete "method" and substitute therefor --apparatus--.

Claim 15, column 21, line 61, delete "method" and substitute therefor --apparatus--.

Claim 16, column 22, line 1, delete "method" and substitute therefor --apparatus--.

Claim 17, column 22, line 6, delete "method" and substitute therefor --apparatus--.

Claim 19, column 22, line 17, delete "method" and substitute therefor --apparatus--.

Signed and Sealed this

Twenty-ninth Day of March, 1994

*Attest:*

BRUCE LEHMAN

*Attesting Officer*     *Commissioner of Patents and Trademarks*